United States Patent
Miyake et al.

(10) Patent No.: US 9,817,174 B2
(45) Date of Patent: Nov. 14, 2017

(54) POLYCARBONATE RESIN COMPOSITION FOR LIGHT GUIDES, AND LIGHT GUIDE AND SURFACE LIGHT SOURCE BODY COMPRISING THE SAME

(75) Inventors: Toshiyuki Miyake, Tokyo (JP); Atsushi Hayashida, Tokyo (JP); Yoshiaki Mori, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/113,714

(22) PCT Filed: Apr. 26, 2012

(86) PCT No.: PCT/JP2012/061697
§ 371 (c)(1),
(2), (4) Date: Jan. 8, 2014

(87) PCT Pub. No.: WO2012/147996
PCT Pub. Date: Nov. 1, 2012

(65) Prior Publication Data
US 2014/0146569 A1    May 29, 2014

(30) Foreign Application Priority Data
Apr. 28, 2011 (JP) .................... 2011-101405

(51) Int. Cl.
| | | |
|---|---|---|
| *G02B 1/04* | (2006.01) | |
| *F21V 8/00* | (2006.01) | |
| *C08K 5/42* | (2006.01) | |
| *C08L 69/00* | (2006.01) | |
| *C08K 5/521* | (2006.01) | |
| *C08K 5/526* | (2006.01) | |
| *C08K 5/5393* | (2006.01) | |

(52) U.S. Cl.
CPC .............. *G02B 6/0033* (2013.01); *C08K 5/42* (2013.01); *C08K 5/521* (2013.01); *C08K 5/526* (2013.01); *C08K 5/5393* (2013.01); *G02B 1/04* (2013.01); *G02B 1/045* (2013.01); *G02B 6/0065* (2013.01); *G02B 6/0055* (2013.01)

(58) Field of Classification Search
USPC ................. 524/130, 140, 147, 151.156, 157
See application file for complete search history.

(56) References Cited

U.S. PATENT DOCUMENTS

| | | | | |
|---|---|---|---|---|
| 6,384,114 B1* | 5/2002 | Nodera | .................. | C08K 5/523 524/127 |
| 7,317,067 B2* | 1/2008 | Ikeda et al. | .................... | 528/196 |
| 7,591,578 B2* | 9/2009 | Chang | .............. | G02F 1/133602 362/612 |
| 2003/0158309 A1 | 8/2003 | Ono et al. | | |
| 2005/0182165 A1* | 8/2005 | Ma | ........................ | C08K 3/0058 524/115 |
| 2006/0030647 A1* | 2/2006 | Ebeling | .................. | C08K 5/523 524/115 |
| 2007/0105994 A1* | 5/2007 | Li | .......................... | C08L 69/00 524/115 |
| 2008/0081855 A1* | 4/2008 | Mullen | .................. | C08G 64/14 524/105 |
| 2009/0062438 A1* | 3/2009 | van de Grampel | ... | C08L 69/005 524/158 |
| 2009/0137709 A1* | 5/2009 | Krauter | .................. | C08L 69/00 524/157 |
| 2009/0215934 A1* | 8/2009 | Nakamura et al. | ........... | 524/115 |
| 2010/0069543 A1* | 3/2010 | Monden | .................... | C08K 5/42 524/161 |
| 2010/0168295 A1* | 7/2010 | Breiner | .................... | C08J 7/047 524/127 |
| 2012/0245263 A1* | 9/2012 | Monden et al. | .............. | 524/162 |
| 2012/0251785 A1* | 10/2012 | Ohira | ................... | C08G 77/448 428/156 |

FOREIGN PATENT DOCUMENTS

| | | |
|---|---|---|
| JP | 07-258532 | 10/1995 |
| JP | 08-188709 | 7/1996 |
| JP | 08-311320 | 11/1996 |
| JP | 10-073725 | 3/1998 |
| JP | 2001-131399 | 5/2001 |
| JP | 2002-60528 | 2/2002 |
| JP | 2002-80713 | 3/2002 |
| JP | 2002080707 | 3/2002 |
| JP | 3516908 | 1/2004 |
| JP | 2006-201667 | 8/2006 |
| JP | 2006-249287 | 9/2006 |
| JP | 2006-249292 | 9/2006 |
| JP | 2007-204737 | 8/2007 |
| JP | 2010-254776 | 11/2010 |
| JP | 2010-270295 | 12/2010 |
| JP | 2011-74402 | 4/2011 |
| JP | WO 2011049228 A1 * | 4/2011 ........... C08G 77/448 |

OTHER PUBLICATIONS

English Machine Translation of JP2001-131399, Sep. 30, 2015.*
UL94 Certifications and Limitations, Dec. 2007.*
Frca, Flame Retardants 101, pp. 72-73, Jan. 14, 1998.*
English translation of International Preliminary Report on Patentability and Written Opinion dated Oct. 29, 2013.
European Search Report dated Feb. 23, 2015 in corresponding European Application No. 12777781.1.

* cited by examiner

*Primary Examiner* — Christopher M Rodd
(74) *Attorney, Agent, or Firm* — Wenderoth, Lind & Ponack, L.L.P.

(57) ABSTRACT

A polycarbonate resin composition for light guides which has excellent light guiding properties and flame retardancy, a light guide and a surface light source body.
The light guide is formed from a resin composition which comprises (A) 100 parts by weight of a polycarbonate resin (component A) and (B) 0.001 to 0.1 part by weight of a metal salt-based compound (component B).

12 Claims, 1 Drawing Sheet

POLYCARBONATE RESIN COMPOSITION FOR LIGHT GUIDES, AND LIGHT GUIDE AND SURFACE LIGHT SOURCE BODY COMPRISING THE SAME

TECHNICAL FIELD

The present invention relates to a polycarbonate resin composition for light guides, and a light guide and a surface light source body comprising the same. More specifically, it relates to a polycarbonate resin composition for light guides which is excellent in light guiding properties and flame retardancy and can be advantageously used for optical lenses and light guides, and a light guide and a surface light source body comprising the same.

BACKGROUND ART

Polycarbonate resin is a polymer in which aromatic or aliphatic dioxy compounds are connected to each other by a carbonate ester and is used in many fields as it is excellent in not only transparency and heat resistance but also mechanical properties such as impact resistance. It is widely used in application fields in which high transparency is required, such as lighting covers and protective covers for transmission type displays, making use of high light transmittance and excellent transparency typified by extremely low haze of a polycarbonate resin.

However, the transparency of a polycarbonate may be not satisfactory when it is used in liquid crystal displays for personal computers and cell phones and lighting equipment. That is, a material having little light attenuation from a light source, that is, light guiding properties is desired for a surface light source body which receives light from a light source and emits light from the surface so as to emit light even from the end face uniformly and efficiently.

Since a material which is light in weight and excellent in workability is also desired, polymethyl methacrylate (to be abbreviated as PMMA hereinafter) out of thermoplastic resins has been used as the most suitable material. However, PMMA is not always satisfactory in terms of heat resistance, impact resistance and flame retardancy, and its use environment is limited in the above applications.

Meanwhile, although the polycarbonate resin can be used without any problem in terms of heat resistance and impact resistance, its transparency is not as high as that of PMMA and therefore, it has not been used for application fields in which light guiding properties are required. In this situation, display devices and lighting equipment which comprise a light emitting diode (LED) as a light source are attracting attention from the viewpoint of long service life and low power consumption. Since LED is an electric appliance which emits light with a polar direct current, flame retardancy required for ordinary electric and electronic equipment is required for optical members comprising an LED as a light source. Actually, new standards such as UL8750 (LED Equipment for Use in Lighting Produce) were established for final products comprising an LED as a light source in December 2009 in the U.S.A.

An example in which the light guiding properties of a polycarbonate have been improved is a composition prepared by mixing an aromatic polycarbonate resin with an acrylic resin having high transparency (Patent Documents 1 to 4) A resin composition for light guides prepared by mixing a polycarbonate having a viscosity average molecular weight of 13,000 to 15,000 with a stabilizer and a release agent was reported (Patent Document 5). Although the light guiding properties of the polycarbonate were improved, these patent documents are silent about flame retardancy. Also, a polycarbonate resin composition which has flame retardancy and transparency was reported (Patent Documents 6 to 9). However, these reports mention transparency but not light guiding properties.

(Patent Document 1) Japanese Patent No. 3100853
(Patent Document 2) Japanese Patent No. 3330498
(Patent Document 3) Japanese Patent No. 3516908
(Patent Document 4) JP-A 2006-201667
(Patent Document 5) JP-A 2007-204737
(Patent Document 6) Japanese Patent No. 2852201
(Patent Document 7) Japanese Patent No. 4060500
(Patent Document 8) Japanese Patent No. 3129374
(Patent Document 9) JP-A 2002-80713

DISCLOSURE OF THE INVENTION

It is an object of the present invention to provide a polycarbonate resin composition for light guides which is excellent in light guiding properties and flame retardancy, a light guide and a surface light source body.

The inventors of the present invention found that when a polycarbonate resin contains a metal salt-based compound which has been used as a flame retardant, the light guiding properties of the polycarbonate resin can be improved and a resin composition having excellent light guiding properties and flame retardancy can be obtained without using a light diffusing agent. The present invention was accomplished based on this finding.

That is, the present invention is a resin composition which comprises 100 parts by weight, of a polycarbonate resin (component A), 0.001 to 0.1 part by weight of a metal salt-based compound (component B) and no light diffusing agent and a light guide formed from the resin composition.

The resin composition preferably comprises 0.001 to 0.1 part by weight of a trialkyl phosphate (component C) and 0.001 to 1.0 part by weight of a heat stabilizer (component D) except for the trialkyl phosphate based on 100 parts by weight of the component A.

The component D is preferably at least one compound selected from the group consisting of a compound represented by the following formula (1), a compound represented by the following formula (2), and a compound represented by the following formula (3).

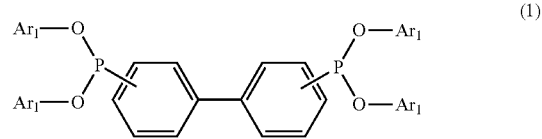

(1)

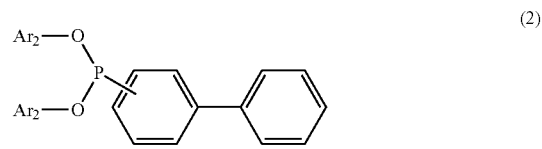

(2)

(3)

[In the above formulas, $Ar_1$'s and $Ar_2$'s are aromatic groups which may have an alkyl substituent having 6 to 20 carbon atoms and may be the same or different. $Ar_3$'s are dialkyl-substituted aromatic groups having 8 to 20 carbon atoms and may be the same or different.]

The component D is preferably a compound represented by the following formula (4).

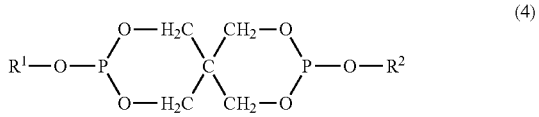

[In the above formula, $R^1$ and $R^2$ are each a hydrogen atom, alkyl group, cycloalkyl group, alkyl-substituted cycloalkyl group, aryl group, alkyl-substituted aryl group or aryl-substituted aryl group and may be the same or different.]

The component D is preferably a compound represented by the following formula (5).

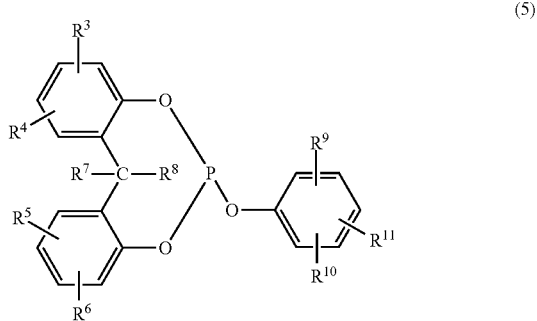

[In the above formula, $R^3$, $R^4$, $R^5$, $R^6$, $R^9$, $R^{10}$ and $R^{11}$ are each independently a hydrogen atom, alkyl group having 1 to 12 carbon atoms, cycloalkyl group, aryl group or aralkyl group, $R^7$ is a hydrogen atom or alkyl group having 1 to 4 carbon atoms, and $R^8$ is a hydrogen atom or methyl group.]

The component B is preferably an organic alkali metal salt and/or an organic alkali earth metal salt.

The component B is preferably at least one organic alkali (earth) metal salt selected from the group consisting of alkali (earth) metal salts of a perfluoroalkylsulfonic acid, alkali (earth) metal salts of an aromatic sulfonic acid and alkali (earth) metal salts of an aromatic imide. The term "alkali (earth) metal salt" means an alkali metal salt or an alkali earth metal salt.

The component A is preferably a polycarbonate resin having a structural viscosity index (N) of 1.5 to 2.5.

The present invention includes a surface light source body which comprises the above light guide, a reflective plate and a light source.

The present invention is a method for improving the light guiding properties of a molded product formed from a resin composition without using a light diffusing agent, wherein a resin composition comprising 100 parts by weight of a polycarbonate resin (component A), 0.001 to 0.1 part by weight of a metal salt-based compound (component B) and no light diffusing agent is used as the resin composition.

The above method preferably comprises the steps of:
(i) preparing a resin composition which comprises 100 parts by weight of a polycarbonate resin (component A), 0.001 to 0.1 part by weight of a metal salt-based compound (component B) and no light diffusing agent; and
(ii) molding the resin composition to obtain a molded product.

EXPLANATIONS OF LETTERS OR NUMERALS

Figure 1:
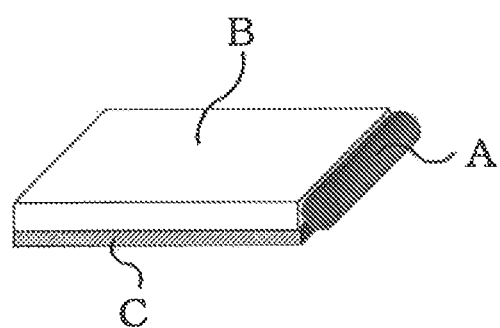
FIG. 1 is a schematic diagram of a surface light source body produced in Example 21.

A. Light source
B. Light guide plate
C. Reflective plate

BEST MODE FOR CARRYING OUT THE INVENTION

The present invention will be described in detail hereinunder.

<Light Guide>

The light guide of the present invention includes what is called a "light guide plate" and a rod-like light guide. All of them are optical products which guide light into a molded product. The light guide of the present invention may be used to transmit light in a direction perpendicular to the surface of a molded product like a lens or a lens cover but preferably used as a display optical product such as a light guide plate which is used in a liquid crystal display device for guiding light along the surface direction of a molded product.

<Light Diffusing Agent>

The resin composition of the present invention is characterized in that it comprises no light diffusing agent. The light diffusing agent refers to fine particles having a refractive index difference from that of the polycarbonate resin (component A) of 0.001 or more, preferably 0.01 or more, more preferably 0.05 or more and much more preferably 0.08 or more.

Examples of the fine particles include organic fine particles typified by polymer fine particles and inorganic fine particles. Out of these, polymer fine particles are preferred, and crosslinked particles obtained by polymerizing a non-crosslinkable monomer with a crosslinkable monomer can be advantageously used.

Examples of a monomer used as the non-crosslinkable monomer in the crosslinked particles include non-crosslinkable vinyl-based monomers such as acrylic monomers, styrene-based monomers and acrylonitrile-based monomers, and olefin-based monomers.

The acrylic monomers include methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate and phenyl methacrylate which may be used alone or in combination. Out of these, methyl methacrylate is particularly preferred.

The styrene-based monomers include styrene, alkyl styrenes such as α-methylstyrene, methyl styrene (vinyl toluene) and ethyl styrene, and halogenated styrenes such as brominated styrene. Styrene is particularly preferred.

The acrylonitrile-based monomers include acrylonitrile and methacrylonitrile. The olefin-based monomers include ethylene and norbornene type compounds. Further, other copolymerizable monomers include glycidyl methacrylate, N-methylmaleimide and maleic anhydride. The organic crosslinked particles of the present invention may have a unit such as N-methylglutarimide.

Examples of the crosslinkable monomer for the non-crosslinkable vinyl-based monomer include divinylbenzene, allyl methacrylate, triallyl cyanurate, triallyl isocyanate, ethylene glycol di(meth)acrylate, diethylene glycol di(meth)acrylate, propylene glycol (meth)acrylate, 1,6-hexanediol di(meth)acrylate, trimethylolpropane (meth)acrylate, pentaerythritol tetra(meth)acrylate, bisphenol A di(meth)acrylate, dicyclopentanyl di(meth)acrylate, dicyclopentenyl di(meth)acrylate and N-methylol (meth)acrylamide. As the other crosslinked particles may be used silicone crosslinked particles typified by polyorganosilsesquioxane.

The resin composition of the present invention exhibits light guiding properties without containing a light diffusing agent. Although the reason for this is under investigation, it is conceivable that fine air bubbles are produced by the metal salt-based compound (component B) in the polycarbonate resin to exhibit light guiding properties.

<Component A: Polycarbonate Resin>

The polycarbonate resin (component A) is generally obtained by reacting a dihydroxy compound with a carbonate precursor by interfacial polycondensation or melt transesterification, by polymerizing a carbonate prepolymer by solid-phase transesterification, or by ring-opening polymerizing a cyclic carbonate compound.

The dihydroxy compound as used herein may be a bisphenol or an aliphatic diol if it is used as a dihydroxy compound for an aromatic polycarbonate.

Examples of the bisphenol include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl) propane, 2,2-bis(4-hydroxy-3-methylphenyl) propane, 1,1-bis(4-hydroxyphenyl)-3,3,5-trimethylcyclohexane, 2,2-bis(4-hydroxy-3,3'-biphenyl) propane, 2,2-bis(4-hydroxy-3-isopropylphenyl)propane, 2,2-bis(3-t-butyl-4-hydroxyphenyl) propane, 2,2-bis(4-hydroxyphenyl)butane, 2,2-bis(4-hydroxyphenyl) octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl) diphenylmethane, 9,9-bis(4-hydroxyphenyl) fluorene, 9,9-bis(4-hydroxy-3-methylphenyl) fluorene, 1,1-bis(4-hydroxyphenyl)cyclohexane, 1,1-bis(4-hydroxyphenyl) cyclopentane, 4,4'-dihydroxydiphenyl ether, 4,4'-dihydroxy-3,3'-dimethyldiphenyl ether, 4,4'-sulfonyl diphenol, 4,4'-dihydroxydiphenyl sulfoxide, 4,4'-dihydroxydiphenyl sulfide, 2,2'-dimethyl-4,4'-sulfonyl diphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl) cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol and 1,3-bis(4-hydroxyphenyl)-5,7-dimethyladamantane. Also, bisphenol compounds having a siloxane structure represented by the following formula (6) may be used.

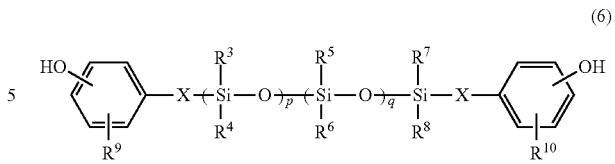

(6)

[In the above formula, $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, p is a natural number, q is 0 or natural number, (p+q) is a natural number of less than 100, and X is a divalent aliphatic group having 2 to 8 carbon atoms.]

Examples of the alkyl group having 1 to 12 carbon atoms represented by $R^3$ to $R^8$ include methyl group, ethyl group, propyl group and butyl group. Examples of the aryl group having 6 to 12 carbon atoms represented by $R^3$ to $R^8$ include phenyl group and naphthyl group. Examples of the substituent for the aryl group include alkyl groups having 1 to 12 carbon atoms such as methyl group, ethyl group, propyl group and butyl group, and halogen atoms such as chlorine atom and bromine atom.

Examples of the alkyl group having 1 to 10 carbon atoms represented by $R^9$ and $R^{10}$ include methyl group, ethyl group, propyl group and butyl group. Examples of the alkoxy group having 1 to 10 carbon atoms represented by $R^9$ and $R^{10}$ include methoxy group, ethoxy group and propoxy group.

Examples of the divalent aliphatic group having 2 to 8 carbon atoms represented by X include alkylene groups having 2 to 10 carbon atoms such as ethylene group, trimethylene group and tetramethylene group.

Examples of the aliphatic diol include 2,2-bis-(4-hydroxycyclohexyl)-propane, 1,14-tetradecanediol, octaethylene glycol, 1,16-hexadecanediol, 4,4'-bis(2-hydroxyethoxy) biphenyl, bis((2-hydroxyethoxy)phenyl)methane, 1,1-bis{(2-hydroxyethoxy)phenyl}ethane, 1,1-bis{(2-hydroxyethoxy)phenyl}-1-phenylethane, 2,2-bis{(2-hydroxyethoxy)phenyl}propane, 2,2-bis{(2-hydroxyethoxy)-3-methylphenyl}propane, 1,1-bis{(2-hydroxyethoxy)phenyl}-3,3,5-trimethylcyclohexane, 2,2-bis{4-(2-hydroxyethoxy-3,3'-biphenyl}propane, 2,2-bis{(2-hydroxyethoxy)-3-isopropylphenyl}propane, 2,2-bis{3-t-butyl-4-(2-hydroxyethoxy)phenyl}propane, 2,2-bis{(2-hydroxyethoxy)phenyl}butane, 2,2-bis{(2-hydroxyethoxy)phenyl}-4-methylpentane, 2,2-bis{(2-hydroxyethoxy)phenyl}octane, 1,1-bis{(2-hydroxyethoxy)phenyl}decane, 2,2-bis{3-bromo-4-(2-hydroxyethoxy)phenyl}propane, 2,2-bis{3,5-dimethyl-4-(2-hydroxyethoxy)phenyl}propane, 2,2-bis{3-cyclohexyl-4-(2-hydroxyethoxy)phenyl}propane, 1,1-bis{3-cyclohexyl-4-(2-hydroxyethoxy) phenyl}cyclohexane, bis{(2-hydroxyethoxy) phenyl}diphenylmethane, 9,9-bis{(2-hydroxyethoxy) phenyl}fluorene, 9,9-bis{4-(2-hydroxyethoxy)-3-methylphenyl}fluorene, 1,1-bis{(2-hydroxyethoxy) phenyl}cyclohexane, 1,1-bis{(2-hydroxyethoxy) phenyl}cyclopentane, 4,4'-bis(2-hydroxyethoxy)diphenyl ether, 4,4'-bis(2-hydroxyethoxy)-3,3'-dimethyldiphenyl ether, 1,3-bis[2-{(2-hydroxyethoxy)phenyl}propyl]benzene, 1,4-bis[2-{(2-hydroxyethoxy)phenyl}propyl]benzene, 1,4-bis{(2-hydroxyethoxy)phenyl}cyclohexane, 1,3-bis{(2-hydroxyethoxy)phenyl}cyclohexane, 4,8-bis{(2-hydroxyethoxy)phenyl}tricyclo[5.2.1.02,6]decane, 1,3-bis{(2-hydroxyethoxy)phenyl}-5,7-dimethyladamantane, 3,9-bis(2-hydroxy-1,1-dimethylethyl)-2,4,8,10-tetraoxaspiro(5,5) undecane, 1,4:3,6-dianhydro-D-sorbitol (isosorbide), 1,4:3, 6-dianhydro-D-mannitol (isomannide) and 1,4:3,6-dianhydro-L-iditol (isoidide).

Out of these, aromatic bisphenols are preferred from the viewpoint of flame retardancy, and 1,1-bis(4-hydroxyphenyl)-1-phenylethane, 2,2-bis(4-hydroxyphenyl) propane, 2,2-bis(4-hydroxy-3-methylphenyl) propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl) fluorene, 1,3-bis{2-(4-hydroxyphenyl)propyl}benzene and 1,4-bis{2-(4-hydroxyphenyl)propyl}benzene, and bisphenol compounds represented by the above formula (5) are more preferred.

2,2-bis(4-hydroxy-phenyl)propane, 1,1-bis(4-hydroxyphenyl)cyclohexane (BPZ), 4,4'-sulfonyldiphenol and 9,9-bis(4-hydroxy-3-methylphenyl) fluorene, and bisphenol compounds represented by the above formula (5) are particularly preferred.

2,2-bis(4-hydroxyphenyl)propane having high strength and high durability is most preferred. They may be used alone or in combination of two or more.

The polycarbonate resin (component A) is preferably changed to a branched polycarbonate resin by using a branching agent in combination with the above dihydroxy compound. A polyfunctional aromatic compound having 3 or more functional groups used in the branched polycarbonate resin is phloroglucin, phloroglucide or a trisphenol such as 4,6-dimethyl-2,4,6-tris(4-hydroxyphenyl) heptene-2,2,4, 6-trimethyl-2,4,6-tris(4-hydroxyphenyl)heptane, 1,3,5-tris (4-hydroxyphenyl)benzene, 1,1,1-tris(4-hydroxyphenyl)ethane, 1,1,1-tris(3,5-dimethyl-4-hydroxyphenyl) ethane, 2,6-bis(2-hydroxy-5-methylbenzyl)-4-methylphenol or 4-{4-[1, 1-bis(4-hydroxyphenyl)ethyl]benzene}-α,α-dimethylbenzylphenol. Tetra(4-hydroxyphenyl)methane, bis (2,4-dihydroxyphenyl) ketone, 1,4-bis(4,4-dihydroxytriphenylmethyl)benzene, or trimellitic acid, pyromellitic acid, benzophenone tetracarboxylic acid and acid chlorides thereof may also be used.

Out of these, 1,1,1-tris(4-hydroxyphenyl)ethane and 1,1, 1-tris(3,5-dimethyl-4-hydroxyphenyl)ethane are preferred, and 1,1,1-tris(4-hydroxyphenyl)ethane is particularly preferred.

When the polycarbonate resin (component A) is changed to a branched polycarbonate resin, its structural viscosity index (N) is preferably 1.5 to 2.5, more preferably 1.5 to 2.2, much more preferably 1.6 to 2.2 and most preferably 1.7 to 2.2. The structural viscosity index (N) as used herein is used as an index defining melt flowability characteristics and represented by the following equation [1].

$$D = a\sigma^N \quad [1]$$

In the above equation [1], "D" is a shear speed (1/sec), "a" is a constant, σ is shear stress (Pa), and N is a structural viscosity index. This structural viscosity index is measured based on ISO11443.

These polycarbonate resins are produced by reaction means known per se for producing an ordinary aromatic polycarbonate resin, for example, reacting an aromatic dihydroxy component with a carbonate precursor such as phosgene or a diester carbonate. A brief description is given of basic means for this production method.

A reaction in which phosgene is used as the carbonate precursor is generally carried out in the presence of an acid binder and a solvent. As the acid binder may be used an alkali metal, hydroxide such as sodium hydroxide or potassium hydroxide, or an amine compound such as pyridine. As the solvent may be used a halogenated hydrocarbon such as methylene chloride or chlorobenzene. A catalyst such as a tertiary amine or a quaternary ammonium salt may be used to promote the reaction. The reaction temperature is generally 0 to 40° C., and the reaction time is several minutes to 5 hours. A transesterification reaction in which a diester carbonate is used as the carbonate precursor is carried out by stirring an aromatic dihydroxy component and the diester carbonate in a predetermined ratio under heating in an inert gas atmosphere and distilling off the formed alcohol or phenol. The reaction temperature which differs according to the boiling point of the formed alcohol or phenol is generally 120 to 300° C. The reaction is completed while the formed alcohol or phenol is distilled off by setting a reduced pressure from the beginning. A catalyst which is used for an ordinary transesterification reaction may be used to promote the reaction. Examples of the diester carbonate used in the above transesterification reaction include diphenyl carbonate, dinaphthyl carbonate, bis(diphenyl)carbonate, dimethyl carbonate, diethyl carbonate and dibutyl carbonate. Out of these, diphenyl carbonate is particularly preferred.

In the present invention, a terminal capping agent is preferably used in the polymerization reaction. The terminal capping agent is used to control the molecular weight, and the obtained polycarbonate resin is superior in heat stability to a polycarbonate resin whose terminal is not capped. Examples of the terminal capping agent include monofunctional phenols represented by the following formulas (7) to (9).

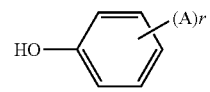
(7)

[In the above formula, A is a hydrogen atom, alkyl group having 1 to 9 carbon atoms, alkylphenyl group (alkyl moiety has 1 to 9 carbon atoms), phenyl group or phenylalkyl group (alkyl moiety has 1 to 9 carbon atoms), and r is an integer of 1 to 5, preferably 1 to 3.]

In the above formula (7), examples of the alkyl group having 1 to 9 carbon atoms include methyl group, ethyl group, propyl group, butyl group and tert-butyl group. Examples of the alkyl moiety of the alkylphenyl group and the phenylalkyl group include methyl group, ethyl group, propyl group and butyl group.

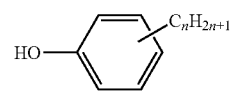
(8)

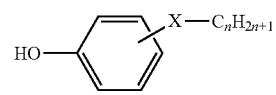
(9)

[In the above formulas, X is —R—O—, —R—CO—O— or —R—O—CO—. R is a single bond or a divalent aliphatic hydrocarbon group having 1 to 10, preferably 1 to 5 carbon atoms, and n is an integer of 10 to 50.]

In the formulas (8) and (9), examples of the divalent aliphatic hydrocarbon group represented by R include alkylene groups having 2 to 10 carbon atoms such as ethylene group, trimethylene group and tetramethylene group.

Examples of the monofunctional phenol represented by the above formula (7) include phenol, isopropylphenol, p-tert-butylphenol, p-cresol, p-cumylphenol, 2-phenylphenol, 4-phenylphenol and isooctylphenol.

The monofunctional phenols represented by the above formulas (8) and (9) are phenols having a long-chain alkyl group or an aliphatic ester group as a substituent. When the terminal of the polycarbonate resin is capped by using these, they not only serve as a terminal capping agent or a molecular weight control agent but also have the effects of improving the melt flowability of the resin to facilitate molding and reducing the water absorption of the resin. Therefore, they are preferably used.

The substituted phenol represented by the above formula (8) is preferably a phenol in which n is 10 to 30, particularly preferably 10 to 26, as exemplified by decylphenol, dodecylphenol, tetradecylphenol, hexadecylphenol, octadecylphenol, eicosylphenol, docosylphenol and triacontylphenol.

The substituted phenol of the above formula (9) is suitably a compound in which X is —R—CO—O— and R is a single bond, preferably a compound in which n is 10 to 30, specifically 10 to 26, as exemplified by decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate. Out of these monofunctional phonols, monofunctional phenols represented by the above formula (7) are preferred, alkyl-substituted or phenylalkyl-substituted phenols are more preferred, and p-tert-butylphenol, β-cumylphenol and 2-phenylphenol are particularly preferred. The monofunctional phenol terminal capping agent is desirably introduced into terminals which account for at least 5 mol %, preferably at least 10 mol % of the total of all the terminals of the obtained polycarbonate resin. The terminal capping agents may be used alone or in combination of two or more.

The polycarbonate resin (component A) may be a polyester carbonate obtained by copolymerizing an aromatic dicarboxylic acid, for example, terephthalic acid, isophthalic acid, naphthalenedicarboxylic acid or a derivative thereof as long as the object of the present invention is not impaired.

The viscosity average molecular weight of the polycarbonate resin (component A) is preferably 13,000 to 50,000, more preferably 16,000 to 30,000, much more preferably 18,000 to 28,000 and most preferably 19,000 to 26,000. When the molecular weight is higher than 50,000, melt viscosity becomes too high, whereby moldability may deteriorate, and when the molecular weight is lower than 13,000, there arises a problem with mechanical strength, and flame retardancy is hardly exerted. The viscosity average molecular weight as used in the present invention is obtained by first measuring a solution prepared by dissolving 0.7 g of the polycarbonate resin in 100 ml of methylene chloride at 20° C. with an Ostwald viscometer to calculate its specific viscosity M from the following equation and then inserting the obtained specific viscosity into the following equation.

Specific viscosity $(\eta_{sp})=(t-t_0)/t_0$

[$t_0$ is the number of seconds during which methylene chloride drops and t is the number of seconds during which a sample solution drops]

$\eta_{sp}/c=[\eta]+0.45\times[\eta]^2 c ([\eta]$ represents an intrinsic viscosity)

$[\eta]=1.23\times 10^{-4} M^{0.83}$ $c=0.7$

The polycarbonate resin (component A) has a total Cl (chlorine) content of preferably 0 to 200 ppm and more preferably 0 to 150 ppm. When the total Cl content of the polycarbonate resin exceeds 200 ppm, heat stability degrades disadvantageously.

<Component B: Metal Salt-Based Compound>

As the metal salt-based compound (compound B) is preferably used an organic acid metal salt. The metal constituting the organic acid metal salt is preferably an alkali metal or an alkali earth metal, more preferably an alkali metal. Examples of the alkali metal include lithium, sodium, potassium, rubidium and cesium. Out of these, sodium, potassium and cesium are particularly preferred. They may be used alone or in combination of two or more.

The organic acid constituting the organic acid metal salt is selected from aliphatic carboxylic acid, aliphatic sulfonic acid, aliphatic phosphoric acid, aliphatic phosphorous acid, aliphatic imidic acid, aromatic carboxylic acid, aromatic sulfonic acid, aromatic phosphoric acid, aromatic phosphorous acid, aromatic imidic acid, perfluoroalkylcarboxylic acid, perfluoroalkylsulfonic acid, perfluoroalkylphosphoric acid, perfluoroalkylphosphorous acid and perfluoroalkylimidic acid. Out of these, aliphatic carboxylic acid, aliphatic sulfonic acid, aliphatic phosphoric acid, aromatic carboxylic acid, aromatic sulfonic acid, aromatic phosphoric acid, aromatic imidic acid, perfluoroalkylcarboxylic acid, perfluoroalkylsulfonic acid and perfluoroalkylphosphoric acid are preferred. Aromatic carboxylic acid, aromatic sulfonic acid, aromatic imidic acid, perfluoroalkylcarboxylic acid and perfluoroalkylsulfonic acid are more preferred. Aromatic sulfonic acid, aromatic imidic acid and perfluoroalkylsulfonic acid are much more preferred. They may be used alone or in combination of two or more.

Although a combination of a metal and an organic acid is not particularly limited, preferred examples of the metal salt-based compound include sodium benzenesulfonate, potassium benzenesulfonate, sodium p-toluenesulfonate, potassium p-toluenesulfonate, cesium p-toluenesulfonate, dipotassium p-benzenedisulfonate, dipotassium, naphthalene-2,6-disulfonate, sodium biphenyl-3,3'-disulfonate, disodium diphenylsulfide-4,4'-disulfonate, dipotassium diphenylsulfide-4,4'-disulfonate, disodium 4-dodecylphenyl ether disulfonate, polysodium poly(2,6-dimethylphenyleneoxide)polysulfonate, polysodium poly(1,3-phenyleneoxide)polysulfonate, polysodium (1,4-phenyleneoxide)polysulfonate, polypotassium poly(2,6-diphenylphenyleneoxide)polysulfonate, lithium poly(2-fluoro-6-butylphenyleneoxide)polysulfonate, potassium diphenylsulfoxide-4-sulfonate, sodium saccharate, potassium saccharate, sodium di(p-toluenesulfone)imide, potassium di(p-toluenesulfone)imide, sodium N—(N'-benzylaminocarbonyl)sulfanylimide, potassium N—(N'-benzylaminocarbonyl)sulfanylimide, sodium N-(phenylcarboxyl)sulfanylimide, potassium N-(phenylcarboxyl)sulfanylimide, sodium bis(diphenyl phosphate)imide, potassium bis(diphenyl phosphate)imide, potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate.

Out of these, sodium benzenesulfonate, potassium benzenesulfonate, sodium p-toluenesulfonate, potassium p-toluenesulfonate, cesium p-toluenesulfonate, dipotassium diphenylsulfide-4,4'-disulfonate, disodium 4-dodecylphenyl ether disulfonate, potassium perfluorobutanesulfonate, sodium perfluorobutanesulfonate and cesium perfluorobutanesulfonate are particularly preferred.

Potassium perfluorobutanesulfonate, sodium perfluorobutanesulfonate and cesium perfluorobutanesulfonate are most preferred. They may be used alone or in combination of two or more.

The content of the metal salt-based compound (component B) is 0.001 to 0.1 part by weight, preferably 0.01 to 0.1 part by weight, more preferably 0.01 to 0.08 part by weight and much more preferably 0.03 to 0.08 part by weight based on 100 parts by weight of the component A. When the content of the component B is higher than 0.1 part by weight, light guiding properties which are the feature of the present invention are impaired and when the content is lower than 0.001 part by weight, not only light guiding properties are impaired but also flame retardancy becomes unsatisfactory.

<Component C: Trialkyl Phosphate>

Examples of the trialkyl phosphate (component C) include tributyl phosphate, trimethyl phosphate, triethyl phosphate, tripropyl phosphate, triisopropyl phosphate, tri-tert-butyl phosphate, dimethylisopropyl phosphate and dibutylmethyl phosphate. Out of these, tributyl phosphate and trimethyl phosphate are preferred. They may be used alone or in combination of two or more.

The content of the trialkyl phosphate (component C) is preferably 0.001 to 0.1 part by weight, more preferably 0.001 to 0.08 part by weight, much more preferably 0.001 to 0.05 part by weight and most preferably 0.005 to 0.05 part by weight based on 100 parts by weight of the component A. When the content of the component C falls within the above range, the reduction of the molecular weight and the deterioration of color and flame retardancy at the time of molding the resin composition for light guides of the present invention can be suppressed and light guiding properties can be improved advantageously.

<Component D: Heat Stabilizer Except for Trialkyl Phosphate>

As the heat stabilizer except for the trialkyl phosphate (component D), phosphorus-based heat stabilizers represented by the following formulas (1) to (5) are preferably used.

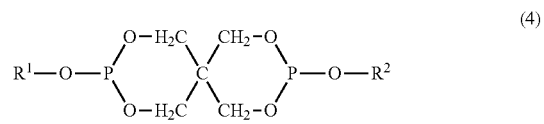

[In the above formulas, $Ar_1$'s and $Ar_2$'s are aromatic groups which may have an alkyl substituent having 6 to 20 carbon atoms and may be the same or different. $Ar_3$'s are dialkyl-substituted aromatic groups having 8 to 20 carbon atoms and may be the same or different.]

Examples of the aromatic groups represented by $Ar_1$ and $Ar_2$ include phenyl group and naphthyl group. Examples of the alkyl substituent for $Ar_1$ and $Ar_2$ include alkyl groups having 1 to 10 carbon atoms such as methyl group, ethyl group, propyl group, butyl group and tert-butyl group.

Examples of the aromatic group represented by $Ar_3$ include phenyl group and naphthyl group. Examples of the alkyl substituent for $Ar_3$ include alkyl groups having 1 to 10 carbon atoms such as methyl group, ethyl group, propyl group, butyl group and tert-butyl group.

$$R^1-O-P\begin{matrix}O-H_2C\\ \\O-H_2C\end{matrix}C\begin{matrix}CH_2-O\\ \\CH_2-O\end{matrix}P-O-R^2 \qquad (4)$$

[In the above formula, $R^1$ are $R^2$ are each a hydrogen atom, alkyl group, cycloalkyl group, alkyl-substituted cycloalkyl group, aryl group, alkyl-substituted aryl group or aryl-substituted aryl group and may be the same or different.]

In the above formula (4), examples of the alkyl group include alkyl groups having 1 to 10 carbon atoms such as methyl group, ethyl group, propyl group, butyl group and tert-butyl group. Examples of the cycloalkyl group include cycloalkyl groups having 3 to 10 carbon atoms such as cyclobutyl group, cyclopentyl group and cyclohexyl group. Examples of the alkyl group substituting the cycloalkyl group include alkyl groups having 1 to 10 carbon atoms such as methyl group, ethyl group, propyl group, butyl group and tert-butyl group.

Examples of the aryl group include phenyl group and naphthyl group. Examples of the alkyl group substituting the aryl group include alkyl groups having 1 to 10 carbon atoms such as methyl group, ethyl group, propyl group, butyl group and tert-butyl group. Examples of the aryl group substituting the aryl group include phenyl group and naphthyl group.

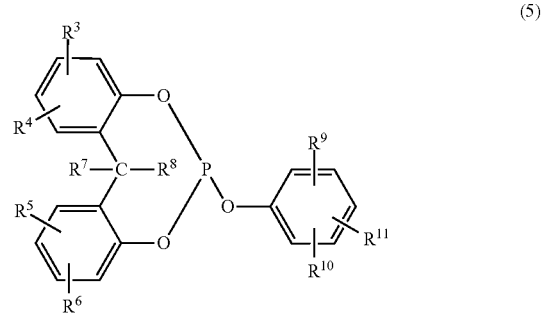

[In the above formula, $R^3$, $R^4$, $R^5$, $R^6$, $R^9$, $R^{10}$ and $R^{11}$ are each independently a hydrogen atom, alkyl group having 1 to 12 carbon atoms, cycloalkyl group, aryl group or aralkyl group, $R^7$ is a hydrogen atom or alkyl group having 1 to 4 carbon atoms, and $R^8$ is a hydrogen atom or methyl group.]

In the above formula (5), examples of the alkyl group having 1 to 1.2 carbon atoms represented by $R^3$ to $R^{11}$ include alkyl groups having 1 to 10 carbon atoms such as methyl group, ethyl group, propyl group, butyl group and tert-butyl group. Example of the cycloalkyl group include cycloalkyl groups having 3 to 10 carbon atoms such as cyclobutyl group, cyclopentyl group and cyclohexyl group. Examples of the aryl group include phenyl group and naphthyl group. Examples of the aralkyl group include benzyl group.

In the above formula (5), examples of the alkyl group having 1 to 4 carbon atoms represented by $R^7$ include methyl group, ethyl group, propyl group, butyl group and tert-butyl group.

Examples of the phosphorus-based heat stabilizer represented by the above formula (1) include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite.

Out of these, tetrakis(di-tert-butylphenyl)-biphenylene diphosphonites are preferred, and tetrakis(2,4-di-tert-butylphenyl)-biphenylene diphosphonites are more preferred. A mixture of two or more tetrakis(2,4-di-tert-butylphenyl)-biphenylene diphosphonites is preferred. Stated more specifically, tetrakis(2,4-di-tert-butylphenyl)-4,4'-biphenylene diphosphonite, tetrakis(2,4-di-tert-butylphenyl)-4,3'-biphenylene diphosphonite and tetrakis(2,4-di-tert-butylphenyl)-3,3'-biphenylene diphosphonite may be used alone or in combination of two or more. A mixture of these three is preferred.

Examples of the phosphorus-based heat stabilizer represented by the above formula (2) include bis(2,4-di-iso-propylphenyl)-4-phenyl-phenyl phosphonite, bis(2,4-di-n-butylphenyl)-3-phenyl-phenyl phosphonite, bis(2,4-di-tert-butylphenyl)-4-phenyl-phenyl phosphonite, bis(2,4-di-tert-butylphenyl)-3-phenyl-phenyl phosphonite, bis(2,6-di-iso-propylphenyl)-4-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite.

Out of these, his (di-tert-butylphenyl)-phenyl-phenyl phosphonites are preferred, and bis(2,4-di-tert-butylphenyl)-phenyl-phenyl phosphonites are more preferred. A mixture of two or more bis(2,4-di-tert-butylphenyl)-phenyl-phenyl phosphonites is preferred. Stated more specifically, bis(2,4-di-tert-butylphenyl)-4-phenyl-phenyl phosphonite and bis(2,4-di-tert-butylphenyl)-3-phenyl-phenyl phosphonite may be used alone or in combination, but a mixture of these two is preferred.

Examples of the phosphorus-based heat stabilizer represented by the above formula (3) include tris(dimethylphenyl)phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite and tris(2,6-di-tert-butylphenyl) phosphite. Tris(2,6-di-tert-butylphenyl)phosphite is particularly preferred.

Preferred examples of the phosphorus-based heat stabilizer represented by the above formula (4) include distearyl pentaerythritol diphosphite. Dioctadecyl pentaerythritol diphosphite, bis(2,4-di-tert-butylphenyl)pentaerythritol diphosphite, bis(2,6-di-tert-butyl-4-methylphenyl)pentaerythritol diphosphite, phenyl bisphenol A pentaerythritol diphosphite and dicyclohexyl pentaerythritol diphosphite. Dioctadecyl pentaerythritol diphosphite, bis(2,4-di-tert-butylphenyl)pentaerythritol diphosphite and bis(2,6-di-tert-butyl-4-methylphenyl)pentaerythritol diphosphite are particularly preferred.

Examples of the phosphorus-based heat stabilizer represented by the above formula (5) include phosphites derived from 2,2'-methylenebis(4,6-di-tert-butylphenol) and 2,6-di-tert-butylphenol, and phosphites derived from 2,2'-methylenebis(4,6-di-tert-butylphenol) and phenol. Phosphites derived from 2,2'-methylenebis(4,6-di-tert-butylphenol) and phenol are particularly preferred.

The phosphorus-based heat stabilizer represented by the formula (5) may be produced by known methods. For example, a bisphenol compound represented by the following formula (10) and phosphorus trichloride are reacted with each other to obtain a corresponding phosphoric acid chloride which is then reacted with phenol represented by the following formula (11).

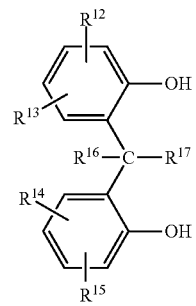

(10)

(In the formula (10), $R^{12}$, $R^{13}$, $R^{14}$ and $R^{15}$ are each a hydrogen atom, alkyl group having 1 to 12 carbon atoms, cycloalkyl group, aryl group or aralkyl group, $R^{16}$ is a hydrogen atom or alkyl group having 1 to 4 carbon atoms, and $R^{17}$ is a hydrogen atom or methyl group.)

In the formula (10), examples of the alkyl group having 1 to 12 carbon atoms represented by $R^{12}$ to $R^{15}$ include methyl group, ethyl group, propyl group, butyl group and tert-butyl group. Examples of the cycloalkyl group include cyclobutyl group, cyclopentyl group and cyclohexyl group. Examples of the aryl group include phenyl group and naphthyl group. Examples of the aralkyl group include benzyl group.

In the formula (10), examples of the alkyl group having 1 to 4 carbon atoms represented by $R^{16}$ include methyl group, ethyl group, propyl group, butyl group and tert-butyl group.

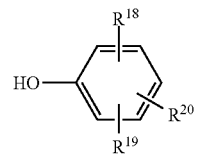

(11)

(In the formula (11), $R^{18}$, $R^{19}$ and $R^{20}$ are each a hydrogen atom, alkyl group having 1 to 12 carbon atoms, cycloalkyl group, aryl group and aralkyl group.)

In the formula (11), examples of the alkyl group having 1 to 12 carbon atoms represented by $R^{18}$ to $R^{20}$ include methyl group, ethyl group, propyl group, butyl group and tert-butyl group. Examples of the cycloalkyl group include cycloalkyl groups having 4 to 10 carbon atoms such as cyclobutyl group, cyclopentyl group and cyclohexyl group. Examples of the aryl group include phenyl group and naphthyl group. Examples of the aralkyl group include benzyl group.

Specific examples of the compound of the above formula (10) include 2,2'-methylenebisphenol, 2,2'-methylenebis(4-methylphenol), 2,2'-methylenebis(6-methylphenol), 2,2'-methylenebis(4,6-dimethylphenol), 2,2'-ethylidenebisphenol, 2,2'-ethylidenebis(4-methylphenol), 2,2'-isopropylidenebisphenol, 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-methylenebis(4-methyl-6-cyclohezylphenol), 2,2'-dihydroxy-3,3'-di(α-methylcyclohexyl)-5,5'-diethyl phenylmethane, 2,2'-methylenebis(6-α-methyl-benzyl-p-cresol), 2,2'-ethylidene-bis(4,6-di-tert-butylphenol) and 2,2-butylidene-bis(4-methyl-6-tert-butylphenol).

Out of these, 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-ethylidene-bis(4,6-di-tert-butylphenol) and 2,2'-butylidene-bis(4-methyl-6-tert-butylphenol) are preferred.

Specific examples of the compound of the formula (11) include phenol, 2-methylphenol, 3-methylphenol, 4-methylphenol, 2,4-dimethylphenol, 2,6-dimethylphenol, 2-tert-butyl-4-methylphenol, 2,4-di-tert-butylphenol, 2,6-di-tert-butylphenol, 2,6-di-tert-butyl-4-methylphenol, 2,4-dimethyl-6-tert-butylphenol, 2,6-di-tert-butyl-4-ethylphenol, 2,4,6-tri-tert-butylphenol and 2,6-di-tert-butyl-4-s-butylphenol. Compounds having two or more alkyl substituents are preferred.

The content of the heat stabilizer except for the trialkyl phosphate (component D) is preferably 0.001 to 1.0 part by weight, more preferably 0.001 to 0.5 part by weight, much more preferably 0.001 to 0.1 part by weight, particularly preferably 0.01 to 0.1 part by weight and most preferably 0.03 to 0.1 part by weight based on 100 parts by weight of the component A. When the content of the component D falls within this range, the reduction of the molecular weight and the deterioration of color at the time of molding the polycarbonate resin composition for light guides of the present invention can be suppressed and light guiding properties can be improved advantageously.

<Other Components>

Although the resin composition for light guides of the present invention may comprise another resin and a filler as long as its transparency and light guiding properties are not impaired, since the resin and the filler impair transparency in most cases, the types and amounts of these materials should be selected in consideration of this.

The resin composition for light guides of the present invention may comprise a thermoplastic resin except for the component A to improve the mechanical properties, chemical properties and electrical properties of a molded product as long as transparency is not impaired. The amount of this thermoplastic resin which changes according to its type and purpose is preferably 0.01 to 30 parts by weight, more preferably 0.1 to 20 parts by weight and much more preferably 1 to 20 parts by weight based on 100 parts by weight of the component A.

Examples of the thermoplastic resin include general-purpose plastics typified by polyethylene resin and polypropylene resin, engineering plastics typified by polyphenylene ether resin, polyacetal resin, polyamide resin, cyclic polyolefin resin and polyarylate resin (amorphous polyarylate, liquid crystalline polyarylate), and so-called "super-engineering plastics" such as polyether ether ketone, polyether imide, polysulfone, polyether sulfone and polyphenylene sulfide. Further, thermoplastic elastomers such as olefin-based thermoplastic elastomers, polyamide-based thermoplastic elastomers and polyurethane-based thermoplastic elastomers may also be used.

The resin composition for light guides of the present invention may comprise small amounts of additives known per se in order to provide various functions to and improve the characteristic properties of a molded product. These additives are used in usual amounts as long as the object of the present invention is not impaired.

The additives include a drip inhibitor (such as a fluorine-containing polymer having fibril formability), heat stabilizer except for the component C and the component D, ultraviolet absorbent, optical stabilizer, release agent, lubricant, sliding agent (such as PTFE particles), colorant (pigment, dye), fluorescent brightener, light storage pigment, fluorescent dye, antistatic agent, flowability modifier, crystal nucleating agent, inorganic or organic antibacterial agent, impact modifier typified by graft rubber, infrared absorbent and photochromic agent.

Additives which are used to improve polycarbonate resins are advantageously used to improve the flame retardancy, antioxidant properties, optical stability (ultraviolet stability), releasability and mold corrosion resistance of the resin composition for light guides of the present invention. A detailed description is subsequently given of these additives.

The resin composition for light guides of the present invention may comprise a flame retardant. However, it is preferred that the resin composition for light guides should comprise no halogenated carbonate from the viewpoint of environmental load. As the flame retardant which can be used, a silicone compound is preferred. Although the silicone compound is not particularly limited if light guiding properties which are the object of the present invention can be obtained, to obtain high flame retardancy, a silicone compound having an aromatic group is preferred. Further, to enable the silicone compound to exhibit a flame retarding effect efficiently, its dispersion state in the combustion step is important. The important factor for determining the dispersion state is viscosity. This is considered to be due to the fact that when the silicone compound is too volatile in the combustion step, that is, the viscosity of the silicone compound is too low, silicone remaining in the system at the time of combustion is thin, thereby making it difficult to form a uniform silicone structure at the time of combustion. When the viscosity of the silicone compound is too high, the dispersibility of the silicone compound degrades, which adversely affects flame retardancy and optical properties. From this point of view, the viscosity at 25° C. is preferably 10 to 300 cSt, more preferably 15 to 200 cSt and much more preferably 20 to 170 cSt.

Since the aromatic group of the silicone compound is bonded to a silicone atom, enhances compatibility with the polycarbonate resin, contributes to the retention of high optical properties and is advantageous in the formation of a carbide film at the time of combustion, it contributes to the development of a flame retarding effect. When the silicone compound does not have any aromatic group, it may be difficult to obtain high flame retardancy for the polycarbonate resin composition for light guides of the present invention. The silicone compound is preferably a silicone compound having an Si—H group. More preferably, it is a silicone compound having an Si—H group and an aromatic group in the molecule and at least one silicone compound selected from silicone compounds having (1) a Si—H group content (Si—H content) of 0.1 to 1.2 moles/100 g, (2) a content of an aromatic group represented by the following formula (12) (aromatic group content) of 10 to 70 wt %:

(12)

(In the formula (12), Y's are each independently an OH group or hydrocarbon group having 1 to 20 carbon atoms which may have a hetero atom-containing functional group. m is an integer of 0 to 5. When m is 2 or more in the formula (12), Y's may be different from one another.),
and (3) an average polymerization degree of 3 to 150.

Much more preferably, it is at least one silicone compound selected from silicone compounds containing at least one of constituent units represented by the following formulas (13) and (14) as the Si—H group-containing unit.

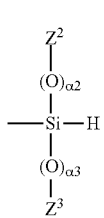
(13)

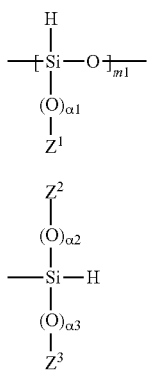
(14)

[In the formulas (13) and (14), $Z^1$ to $Z^3$ are each independently a hydrogen atom, hydrocarbon group having 1 to 20 carbon atoms which may have a hetero atom-containing functional group, or a compound represented by the following formula (15) α1 to α3 are each independently 0 or 1. m1 is 0 or an integer of 1 or more. Further, in the formula (13), when m1 is 2 or more, the recurring units may be different from one another.]

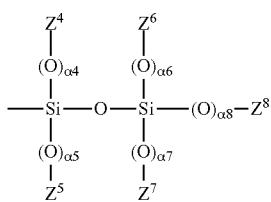
(15)

[In the formula (15), $Z^4$ to $Z^8$ are each independently a hydrogen atom or hydrocarbon group having 1 to 20 carbon atoms which may have a hetero atom-containing functional group. α4 to α8 are each independently 0 or 1.]

Particularly preferably, the silicone compound is a silicone compound comprising a MD unit or a MDT unit when M represents a monofunctional siloxane unit, D represents a bifunctional siloxane unit and T represents a trifunctional siloxane unit.

Examples of the hydrocarbon group having 1 to 20 carbon atoms which may have a hetero atom-containing functional group represented by $Z^1$ to $Z^4$ in the constituent units represented by the above formulas (13), (14) and (15) and Y in the formula (12) include alkyl groups such as methyl group, ethyl group, propyl group, butyl group, hexyl group and decyl group, cycloalkyl groups such as cyclohexyl group, alkenyl groups such as vinyl group and allyl group, aryl groups such as phenyl group and tolyl group, and aralkyl groups. Further, these groups may contain a functional group such as epoxy group, carboxyl group, carboxylic anhydride group, amino group or mercapto group. An alkyl group having 1 to 8 carbon atoms, alkenyl group or aryl group is preferred, and an alkyl group having 1 to 4 carbon atoms such as methyl group, ethyl group or propyl group, vinyl group or phenyl group is particularly preferred.

When the silicone compound containing at least one constituent unit out of the constituent units represented by the above formulas (13) and (14) has a plurality of siloxane bond recurring units, it may be a random copolymer block copolymer or tapered copolymer.

The Si—H content of the preferred silicone compound is preferably 0.1 to 1.2 mol/100 g. When the Si—H content falls within the range of 0.1 to 1.2 mol/100 g, it is easy to form the structure of silicone at the time of combustion. The Si—H content is more preferably 0.1 to 1.0 mol/100 g and most preferably 0.2 to 0.6 mol/100 g. When the Si—H content is low, it is difficult to form the structure of silicone and when the Si—H content is high, the heat stability of the composition degrades. The structure of silicone as used herein is a network structure formed by a reaction between silicone compounds or a reaction between the resin and silicone.

The Si—H content as used herein is the number of moles of a Si—H—R structure contained in 100 g of the silicone compound. This can be obtained by measuring the volume of a hydrogen gas generated per unit weight of the silicone compound by an alkali decomposition method. For example, when 122 ml of a hydrogen gas is generated per 1 g of the silicone compound at 25° C., the Si—H content is 0.5 mol/100 g according to the following calculation formula.

$$122 \times 273/(273+25) \div 22400 \times 100 \approx 0.5$$

The silicone compound used in the present invention preferably has an aromatic group content of 10 to 70 wt %. The aromatic group content is more preferably 15 to 60 wt % and most preferably 25 to 55 wt %. When the aromatic group content of the silicone compound is lower than 10 wt %, the silicone compound is eccentrically located with the result that a dispersion failure occurs, thereby making it difficult to obtain a light guide having excellent optical properties. When the aromatic group content is higher than 70 wt %, the rigidity of the molecule of the silicone compound itself becomes high, whereby the silicone compound is eccentrically located with the result that a dispersion failure occurs as well, thereby making it difficult to obtain a light guide having excellent optical properties.

The aromatic group content as used herein is the content of the aromatic group represented by the above formula (12) in the silicone compound and can be obtained from the following calculation formula.

aromatic group content=$[A/M] \times 100$(wt %)

In the above formula, A and M denote the following numerical values.

A=total molecular weight of all aromatic groups represented by the formula (12) contained in one molecule of silicone compound M=molecular weight of silicone compound Further, the refractive index at 25° C. of the silicone compound used in the present invention is preferably 1.40 to 1.60. The refractive index of the silicone compound is more preferably 1.42 to 1.59 and most preferably 1.44 to 1.59. When the refractive index falls within the above range and the silicone compound is finely dispersed in the polycarbonate, a polycarbonate resin composition for light guides which is little clouded and has excellent dye-affinity is provided.

Further, the silicone compound used in the present invention preferably has a volatilization volume measured by a 105° C./3 hour loss-on-heat method of 18% or less. The volatilization volume of the silicone compound is more preferably 10% or less. When the volatilization volume is larger than 18% and the resin composition of the present invention is extruded and pelletized, the amount of matter volatilized from the resin becomes large, and further a large number of air bubbles are apt to be formed in the light guide of the present invention.

The silicone compound may have a linear or branch structure if it satisfies the above conditions, and compounds having an Si—H— group at any one of a side chain, terminal or branch point, or at a plurality of sites in the molecular structure may be used.

In general, the structure of the silicone compound having an Si—H group in the molecule is constituted by combining the following four siloxane units arbitrarily.

M unit: monofunctional siloxane unit such as $(CH_3)_3SiO_{1/2}$, $H(CH_3)_2SiO_{1/2}$, $H_2(CH)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$ D unit: bifunctional siloxane unit such as $(CH_3)_2SiO$, $H(CH_3)SiO$, $H_2SiO$, $H_2(C_6H_5)SiO$, $(CH_3)(CH_2=CH)SiO$ or $(C_6H_5)_2SiO$ T unit: trifunctional siloxane unit such as $(CH_3)SiO_{3/2}$ $(C_3H_7)SiO_{3/2}$, $HSiO_{3/2}$, $(CH_2=CH)SiO_{3/2}$ or $(C_6H_5)SiO_{3/2}$ Q unit: tetrafunctional siloxane unit represented by $SiO_2$ The structure of the silicone compound containing an Si—H group used in the present invention is represented by $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mT_p$ or $M_mD_nQ_q$, more preferably $M_mD_n$ or $M_mD_nT_p$.

(The coefficients m, n, p and q in the above formulas are each an integer which indicates the polymerization degree of each siloxane unit. When one of m, n, p and q is 2 or more, the number of the siloxane units having this coefficient is 2 or more which differ in the hydrocarbon group having 1 to 20 carbon atoms which may have a bonded hydrogen atom or a bonded hetero atom-containing functional group.)

The total of the above coefficients in each formula indicates the average polymerization degree of the silicone compound. In the present invention, this average polymerization degree is in a range of preferably 3 to 150, more preferably 4 to 80 and much more preferably 5 to 60. When the average polymerization degree is lower than 3, the volatility of the silicone compound itself becomes high, whereby the amount of volatile matter from the resin tends to become large at the time of processing the resin composition comprising this silicone compound. When the average polymerization degree is higher than 150, the flame retardancy and optical properties of the resin composition comprising this silicone compound tend to become unsatisfactory. The above silicone compounds may be used alone or in combination of two or more. The silicone compound having an Si—H bond can be produced by a conventional method known per se. For example, an organochlorosilane corresponding to the structure of a silicone compound of interest is co-hydrolyzed, and the by-produced hydrochloric acid or low-boiling matter is removed to obtain a product of interest. When a silicone oil having a Si—H bond, an aromatic group represented by the formula (12) and a hydrocarbon group having 1 to 20 carbon atoms which may have another hetero atom-containing functional group in the molecule, a cyclic siloxane or an alkoxysilane is used as a starting material, a polymerization reaction is carried out by using an acid catalyst such as hydrochloric acid, sulfuric acid or methanesulfonic acid and adding water for hydrolysis according to circumstances, and then the used acid catalyst and low-boiling matter are removed likewise to obtain a silicone compound of interest.

Further, when the silicone compound containing a Si—H group has siloxane units M, MH, D, DH, Dφ2, T and Tφ represented by the following structural formulas (M: $(CH_3)_3SiO_{1/2}$, MH: $H(CH_3)_2SiO_{1/2}$, D: $(CH_3)_2SiO$, DH: $H(CH_3)SiO$, Dφ2: $(C_6H_5)_2Si$, T: $(CH_3)SiO_{3/2}$, Tφ: $(C_6H_5)SiO_{3/2}$)), and the average numbers of the siloxane units in one molecule are represented by m, mh, d, dh, dp2, t and tp, all the following relational expressions are preferably satisfied.

$$2 \leq m+mh \leq 40$$

$$0.35 \leq d+dh+dp2 \leq 148$$

$$0 \leq t+tp \leq 38$$

$$0.35 \leq mh+dh \leq 110$$

Outside the above ranges, the resin composition for light guides of the present invention hardly achieves excellent flame retardancy and excellent optical properties at the same time, and it may be difficult to produce a silicone compound containing an Si—H group.

The content of the silicone compound used in the present invention is preferably 0.05 to 7 parts by weight, more preferably 0.1 to 4 parts by weight, much more preferably 0.3 to 2 parts by weight and most preferably 0.3 to 1 part by weight based on 100 parts by weight of the component A. When the content of the silicone compound is too high, the heat resistance of the resin degrades, or a gas is readily produced at the time of processing and when the content is too low, flame retardancy is not exhibited.

As the antioxidant which can be contained in the resin composition for light guides of the present invention may be used a phenol-based antioxidant. The phenol-based antioxidant can suppress discoloration at the time of exposure to heat and produces the effect of improving light guiding properties to some extent. Various phenol-based antioxidants may be used.

Preferred examples of the phenol-based antioxidant include vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis (2,6-di-tert-butylphenol), 2,2'-methylenebis(4-methyl-6-cyclohexylphenol), 2,2'-dimethylene-bis(6-α-methylbenzyl-p-cresol), 2,2'-ethylidene-bis(4,6-di-tert-butylphenol), 2,2'-butylidene-bis(4-methyl-6-tert-butylphenol) 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate, bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[(5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-di-thiobis(2,6-di-tert-butylphenol), 4,4'-tri-thiobis(2,6-di-tert-butylphenol) 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-buty-4-hydroxyphenyl)propionyl] hydrazine, 1,1,3-tris(2-methyl-4-hydroxy-5-tert-butylphenyl) butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2[3-(3,5-di-tert-butyl-4-hydroxyphenyl) propionyloxy]ethyl isocyanurate and tetrakis[methylene-3-(3',5'-di-tert-butyl-4-hydroxyphenyl)propionate]methane.

n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 3,9-bis{2-[3-(3-tert-butyl-4-hydroxy-5-methylphenyl)propionyloxy)-1,1-dimethylethyl}-2,4,8,10-tetraoxaspiro[5,5]undecane and hydroxyphenyl)propionate]methane are more preferred, and n-octadecyl-β-(4'-hydroxy-3',5'-di-tert-butylphenyl)propionate is much more preferred.

A sulfur-containing antioxidant may also be used as the antioxidant. It is advantageous particularly when the resin composition is used for rotational molding or compression molding. Examples of the sulfur-containing antioxidant include dilauryl-3,3'-thiodipropionic acid ester, ditridecyl-3,3'-thiodipropionic acid ester, dimyristyl-3,3'-thiodipropionic acid ester, distearyl-, 3'-thiodipropionic acid ester, lauryl stearyl-3,3'-thiodipropionic acid ester, pentaerythritol tetra (β-laurylthiopropionate) ester, bis[2-methyl-4-(3-laurylthiopropionyloxy)-5-tert-butylphenyl]sulfide, octadecyl disulfide, mercaptobenzimidazole, 2-mercapto-6-methylbenzimidazole and 1,1'-thiobis(2-naphthol). Out of these, pentaerythritol tetra(β-laurylthiopropionate) ester is preferred.

The above phenol-based antioxidants and sulfur-containing antioxidants may be used alone or in combination of two or more.

The content of the phenol-based antioxidant or the sulfur-containing antioxidant is preferably 0.0001 to 1 part by weight, more preferably 0.0005 to 0.5 part by weight and much more preferably 0.001 to 0.2 part by weight based on 100 parts by weight of the component A.

The resin composition for light guides of the present invention may comprise a release agent as required. Release agents known per se may be used. Examples of the release agent include saturated fatty acid esters, unsaturated fatty acid esters, polyolefin-based waxes (such as polyethylene wax and 1-alkene polymer. They may be modified by a functional group-containing compound such as an acid), silicone compounds, fluorine compounds, paraffin wax and beeswax. Out of these, saturated fatty acid esters, linear or cyclic polydimethylsiloxane oil and polymethylphenyl silicone oil, and fluorine oil may be used. Saturated fatty acid esters such as monoglycerides including monoglyceride stearate, polyglycerin fatty acid esters including decaglycerin decastearate and decaglycerin tetrastearate, lower fatty acid esters including stearyl stearate, higher fatty acid esters including behenate sebacate, and erythritol esters including pentaerythritol tetrastearate are preferably used. The content of the release agent is preferably 0.01 to 0.3 part by weight based on 100 parts by weight of the component A.

The resin composition for light guides of the present invention may comprise an ultraviolet absorbent as required. Examples of the ultraviolet absorbent include benzophenone-based ultraviolet absorbents such as 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methozybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodium sulfoxybenzophenone and his (5-benzoyl-4-hydroxy-2-methoxyphenyl)methane.

Benzotriazole-based ultraviolet absorbents such as 2-(2'-hydroxy-5'-methylphenyl)benzotriazole, 2-2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-(2'-hydroxy-3'-(3",4",5",6"-tetraphthalimidomethyl)-5'-methylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2,2'-methylenebis[4-(1,1,3,3-tetramethylbutyl)-6-(2H-benzotriazol-2-yl)phenol] and a condensate of methyl-3-[3-tert-butyl-5-(2H-benzotriazol-2-yl)-4-hydroxyphenylpropionate and polyethylene glycol may also be used.

Hydroxyphenyltriazine-based ultraviolet absorbents such as 2-(4,6-diphenyl-1,3,5-triazin-2-yl)-5-hexyloxy-phenol and 2-(4,6-bis-(2,4-dimethylphenyl-3,5-triazin-2-yl)-5-hexyloxy-phenol may also be used.

The resin composition for light guides of the present invention may comprise an optical stabilizer as required. Examples of the optical stabilizer include hindered amines typified by bis(2,2,6,6-tetramethyl-4-piperidyl)sebacate, bis(1,2,2,6,6-pentamethyl-4-piperidyl) sebacate, bis(1,2,2,6,6-pentamethyl-4-piperidyl)-2-(3,5-di-tert-butyl-4-hydroxybenzyl)-2n-butyl malonate, condensate of 1,2,3,4-butanecarboxylic acid, 2,2,6,6-tetramethyl-4-piperidinol and tridecyl alcohol, condensate of 2,3,4-butanedicarboxylic acid, 1,2,2,6,6-pentamethyl-4-piperidinol and tridecyl alcohol, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, poly{[6-(1,1,3,3-tetramethylbutyl)amino-1,3,5-triazin-2,4-diyl]([(2,2,6,6-tetramethylpiperidyl)imino]hexamethylene[((2,2,6,6-tetramethylpiperidyl)imino]}, poly{[6-morpholino-s-triazin-2,4-diyl][(2,2,6,6-tetramethylpiperidyl)imino] hexamethylene[(2,2,6,6-tetramethylpiperidyl)imino]}, condensate of 1,2,3,4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol, condensate of N,N'-bis(3-aminopropyl)ethylenediamine and 2,4-bis[N-butyl-N-(1,2,2,6,6-pentamethyl-4-piperidyl)amino]-chloro-1,3,5-triazine, condensate of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)diethanol and polymethylpropyl-3-oxy-[4-(2,2,6,6-tetramethyl)piperidinyl]siloxane.

The contents of the ultraviolet absorbent and the optical stabilizer are each preferably 0.01 to 5 parts by weight and more preferably 0.02 to 1 part by weight based on 100 parts by weight of the component A.

The resin composition for light guides of the present invention may comprise a bluing agent to erase a yellow tinge based on an ultraviolet absorbent. A bluing agent which is generally used for polycarbonate resin may be used without any problem. In general, anthraquinone-based dyes are easily acquired and preferred. Examples of the bluing agent include generic name Solvent Violet13 [CA. No (color index No) 60725; trade name: "Macrolex Violet B" of Bayer AG, "Dia Resin Blue G" of Mitsubishi Chemical Co., Ltd. and "Sumiplast Violet B" of Sumitomo Chemical Co., Ltd.], generic name Solvent Violet31 [CA. No 68210; trade name: "Dia Resin Violet D" of Mitsubishi Chemical Co., Ltd.], generic name Solvent Violet33 [CA. No 60725; trade name: "Dia Resin Blue j" of Mitsubishi Chemical. Co., Ltd.], generic name Solvent Blue94[CA. No 61500; trade name: "Dia Resin Blue N" of Mitsubishi Chemical Co., Ltd.], generic name Solvent Violet36 [CA. No 68210; trade name: "Macrolex Violet 3R" of Bayer AG], generic name Solvent Blue97 [trade name; "Macrolex Blue RR" of Bayer AG] and generic name Solvent Blue45 [CA. No 61110; trade name: "Tetrasol Blue RLS" of Sandoz AG]. "Macrolex Blue RR", "Macrolex Violet B" and "Terasol Blue RLS" are particularly preferred. The content of the bluing agent is preferably 0.000005 to 0.0010 part by weight and more preferably 0.00001 to 0.0001 part by weight based on 100 parts by weight of the component A.

The resin composition for light guides of the present invention may comprise an epoxy compound as required. The epoxy compound is used to suppress the corrosion of a metal mold, and all epoxy compounds having an epoxy functional group may be basically used. Preferred examples of the epoxy compound include 3,4-epoxycyclohexylmethyl-3',4'-epoxycyclohexyl carboxylate, 1,2-epoxy-4-(2-oxiranyl)cyclohexane adduct of 2,2-bishydroxymethyl)-1-butanol, copolymer of methyl methacrylate and glycidyl methacrylate, and copolymer of styrene and glycidyl methacrylate. The content of the epoxy compound is preferably 0.003 to 0.2 part by weight, more preferably 0.004 to 0.15 part by weight and much more preferably 0.005 to 0.1 part by weight based on 100 parts by weight of the component A.

<Production of Resin Composition for Light Guides>

The resin composition for light guides of the present invention can be produced by an arbitrary method. For example, the components A to D and optionally other components are fully mixed together by using pre-mixing means such as a twin-cylinder mixer, Henschel mixer, mechanochemical device or extrusion mixer. Thereafter, the resulting mixture is optionally granulated by means of an extrusion granulator or briquetting machine, melt kneaded by means of a melt kneader typified by a vented double-screw extruder and then pelletized by means of a device such as a pelletizer. Alternatively, a method in which the components A to D and optionally other components are supplied into a melt kneader typified by a vented double-screw extruder independently, a method in which the component A and some of other components are pre-mixed together and supplied into a melt kneader independently of the other components, or a method in which the component B is diluted and mixed with water or an organic solvent and the resulting mixture is supplied into a melt kneader, or the diluted mixture is premixed with other components and the obtained mixture is supplied into a melt kneader may be employed. When there is a liquid component to be mixed, a liquid injection device or a liquid adder may be used to supply it into the melt kneader.

<Light Guide>

The light guide of the present invention has excellent light guiding properties. Even when it is away from a light source, the reduction ratio of brightness is low. That is, the light guiding properties of the light guide of the present invention are defined as high when brightness described in Examples is high if the light guide is away from a light source. Stated more specifically, it is defined that light guiding properties are high when the brightness is 50% or more of the brightness of the light source itself.

The light guide of the present invention is formed from the above resin composition for light guides. An arbitrary method is employed to manufacture the light guide of the present invention. For example, after the above resin composition for light guides is kneaded by means of an extruder, Banbury mixture or roll, it is molded by a conventionally known method such as injection molding, extrusion molding or compression molding to obtain a light guide. The light guide may have any shape such as plate-like, cylindrical or spherical shape according to intended use. The surface may be formed prismatic.

<Surface Light Source Body>

The surface light source body of the present invention comprises the light guide (light guide plate) of the present invention, a reflective plate and a light source. The reflective plate is placed on one side of the light guide. One side of the reflective plate may be formed prismatic when the light guide is molded. Alternatively, after the light guide is molded, the reflective plate may be joined to the light guide.

The light source is placed on at least one side of the light guide. As the light source may be used a fluorescent lamp, or a self-light emitter such as a cold-cathode tube, LED, laser diode or organic EL.

The light guide and surface light source body of the present invention are used in display parts for cell phones, portable terminals, cameras, timepieces, notebook personal computers, displays, lighting, signals, auto lamps and home electric and optical equipment. When flame retardancy is required for peripheral equipment as in the case when LED is used as a light source for electric equipment, the light guide and surface light source body of the present invention are advantageously used.

<Method for Improving Light Guiding Properties>

The present invention is a method for improving the light guiding properties of a molded product formed from the resin composition without using a light diffusing agent. The present invention includes a method in which a resin composition comprising 100 parts by weight of a polycarbonate resin (component A), 0.001 to 0.1 part by weight of a metal salt-based compound (component B) and no light diffusing agent is used.

The above method preferably comprises the following steps:

(i) preparing a resin composition comprising 100 parts by weight of a polycarbonate resin (component A), 0.001 to 0.1 part by weight of a metal salt-based compound (component B) and no light diffusing agent; and (ii) molding the resin composition to obtain a molded product.

According to the method of the present invention, the light guiding properties of a molded product formed from the resin composition can be improved without using a light diffusing agent. The brightness is preferably 50% or more, preferably 60% or more, more preferably 70% or more and much more preferably 80% or more of the brightness of the light source itself.

EXAMPLES

The following examples are provided for the purpose of further illustrating the present invention but are in no way to be taken as limiting.

The following items were evaluated.

(i) Brightness

A pellet obtained from the composition of each Example was dried at 120° C. for 6 hours with a hot air drier and molded at a cylinder temperature of 320° C. and a mold temperature of 80° C. by means of an injection molding machine [SG150U•S-M IV of Sumitomo Heavy Industries, Ltd.] to manufacture a plate having a length of 150 mm, a width of 150 mm, a thickness of 5.0 mm and an Ra of 0.03 μm as a light guide plate. A light source (cold-cathode tube) was placed on the end face side of one side (illuminated side) of this light guide plate to measure the brightness of the end face opposite to the illuminated side with the BM-0.7 of Topcon Corporation. At this point, the both sides of the light guide plate were sandwiched between black light absorbing plates to prevent light leakage from the illuminated side. The brightness of the light source was 4,850 cd/m.

(ii) Haze

The haze of the obtained light guide plate was measured in accordance with JIS K7105. The light guide plate is evaluated as ○ when its haze is 2% or less, Δ when its haze is more than 2% and less than 20% and X when its haze is 20% or more.

(iii) Flame Retardancy

The pellet obtained from the composition of each Example was dried at 120° C. for 6 hours with a hot air circulation drier and molded at a cylinder temperature of 320° C. and a mold temperature of 80° C. by means of an injection molding machine [IS150EN-5Y of Toshiba Machine Co., Ltd.] to manufacture a test specimen for the evaluation of flame retardancy. An UL94 vertical, burn test was made on the specimen having a thickness of 2.0 mm to evaluate its flame retardancy. When the specimen cannot attain V-0, V-1 or V-2 rating, it is evaluated as "not V".

Examples 1 to 20, Comparative Examples 1 to 3

[Preparation of Resin Composition]

Resin compositions having a mixing ratio shown in Table 1 were prepared as follows. Symbols in the table are used for explanation. Components in a ratio shown in Table 1 were weighed and uniformly mixed together by means of a tumbler, and the resulting mixtures were each injected into an extruder to prepare resin compositions. A vented double-screw extruder having a diameter of 30 mm (KTX-30 of Kobe Steel, Ltd.) was used as the extruder. As for screw configuration, a first kneading zone (consisted of 2 feed kneading disks, 1 feed rotor, 1 return rotor and 1 return kneading disk; was located before the position of the vent, and a second kneading zone (consisted of 1 feed rotor and 1 return rotor) was located after the position of the vent. A strand was extruded at a cylinder temperature of 290° C., a dice temperature of 290° C. and a vent suction degree of 3,000 Pa, cooled in a water bath and cut with a pelletizer to obtain a pellet.

The used raw materials are shown in Tables 1 and 2.
(Component A)
A-1: aromatic polycarbonate resin having a branch structure (branching fraction of 0.97 mol %, molecular weight of 25,100, structural viscosity index (N) of 2.03)
(Production Method of A-1)

2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of bisphenol A was dissolved under agitation (bisphenol A solution), 2,299 parts of methylene chloride, 112 parts of a 48.5% sodium hydroxide aqueous solution and 38.1 parts (1.00 mol %) of an aqueous solution prepared by dissolving 1,1,1-tris(4-hydroxyphenyl)ethane in a 14% sodium hydroxide aqueous solution to a concentration of 25% were added to the resulting solution, and 354 parts of phosgene was blown into the reactor at 15 to 25° C. for about 90 minutes to carry out a phosgene reaction.

After the end of the phosgene reaction, 219 parts of a 11% methylene chloride solution of p-tert-butylphenol and 88 parts of a 48.5% sodium hydroxide aqueous solution were added, stirring was suspended, the resulting product was left for 10 minutes and separated, stirring was resumed to emulsify the product, and five minutes after that, the obtained emulsion was treated 35 times of pass at a revolution of 1,200 rpm by means of a homomixer (manufactured by PRIMIX Corporation) to obtain a highly emulsified dope. This highly emulsified dope was reacted in a polymerization tank (having a stirrer) at a temperature of 35° C. for 3 hours under no agitation to complete polymerization.

After the end of the reaction, 5,728 parts of methylene chloride was added to dilute the reaction mixture, a methylene chloride phase was separated from the reaction mixture, 5,000 parts of ion exchange water was added to and mixed with the separated methylene chloride phase under agitation, stirring was suspended, and a water phase and an organic phase were separated from each other.

Then, aqueous cleaning was repeated until the electric conductivity of the water phase became almost equal to that of ion exchange water to obtain a purified polycarbonate resin solution. Subsequently, methylene chloride was evaporated from the purified polycarbonate resin solution at a liquid temperature of 75° C. in a 1,000-liter kneader filled with 100 liters of ion exchange water to obtain particulate matter. 25 parts of the particulate matter and 75 parts of water were injected into a hot-water treating tank equipped with a stirrer and mixed together at a water temperature of 95° C. for 30 minutes under agitation. Thereafter, the obtained mixture of the particulate matter and water was centrifuged to obtain particulate matter containing 0.5 wt % of methylene chloride and 45 wt % of water.

Subsequently, this particulate matter was continuously supplied into a conductive heat receiving groove type double-screw stirring continuous drier made of SUS316L and controlled at 140° C. at a rate of 50 kg/hr (in terms of polycarbonate resin) to be dried for an average drying time of 3 hours so as to obtain polycarbonate resin particulate matter having a branch structure.

This polycarbonate resin having a branch structure obtained as described above had a viscosity average molecular weight of 25,100, a branching fraction of 0.97 mol % and a structural viscosity index (N) of 2.03.

A-2: aromatic polycarbonate resin having a branch structure (branching fraction of 0.95 mol %, molecular weight of 20,300, structural viscosity index (N) of 1.72)

(Production Method of A-2)

Polycarbonate resin particulate matter having a branch structure was obtained in the same manner as the production method of A-1 except that the amount of the 11% methylene chloride solution of p-tert-butylphenol was changed to 261 parts. The aromatic polycarbonate resin having a branch structure obtained as described above had a viscosity average molecular weight of 20,300, a branching fraction of 0.95 mol % and a structural viscosity index (N) of 1.72.

A-3: aromatic polycarbonate resin having a branch structure (branching fraction of 0.98 mmol %, molecular weight of 16,200 and structural viscosity index (N) of 1.50)

(Production Method of A-3)

Polycarbonate resin particulate matter having a branch structure was obtained in the same manner as the production method of A-1 except that the amount of the 11% methylene chloride solution of p-tert-butylphenol was changed to 315 parts. The aromatic polycarbonate resin having a branch structure obtained as described above had a viscosity average molecular weight of 16,200, a branching fraction of 0.98 mol % and a structural viscosity index (N) of 1.50.

A-4: linear polycarbonate resin (polycarbonate resin comprising bisphenol A and p-tert-butylphenol as a terminal capping agent and prepared by the phosgene method. The polycarbonate resin was produced without using an amine-based catalyst and had a terminal hydroxyl group content of 10 mol % based on the total of all the aromatic polycarbonate resin terminals, a viscosity average molecular weight of 25,500 and a structural viscosity index (N) of 1.48)

A-5: linear polycarbonate resin (polycarbonate resin comprising bisphenol A and p-tert-butylphenol as a terminal capping agent and prepared by the phosgene method. The polycarbonate resin was produced without using an amine-based catalyst and had a terminal hydroxyl group content of 10 mol % based on the total of all the aromatic polycarbonate resin terminals, a viscosity average molecular weight of 19,700 and a structural viscosity index (N) of 1.27)

(Component B)

B-1: potassium perfluorobutanesulfonate (Megafac F-114P of Dainippon Ink and Chemicals, Inc.)

B-2: sodium perfluorobutanesulfonate (Megafac F-114S of DIC Corporation)

B-3: potassium diphenylsulfonesulfonate (KSS of UCB Japan Co., Ltd.)

(Component C)

C-1: trimethyl phosphate (TMP of Daihachi Chemical Industry Co., Ltd.)

(Component D)

D-1: phosphorus-based heat stabilizer (Phostanox P-EPQ Of Clariant Japan, main component: tetrakis(2,4-di-tert-butylphenyl)-4,4'-biphenylene diphosphonite)

D-2: phosphorus-based heat stabilizer (Irgafos168 of Ciba Specialty Chemicals Corporation) tris(2,4-di-tert-butylphenyl)phosphite D-3: phosphorus-based heat stabilizer (ADK STAB PEP-36 of ADEKA Corporation, bis(2,6-di-tert-butyl-4-methylphenyl)pentaerythritol diphosphite)

D-4: phosphorus-based heat stabilizer (ADK STAB PEP-8 of ADEKA Corporation, dioctadecyl pentaerythritol diphosphite)

(Other Components)

SIH: silicone compound having a Si—H group and an aromatic group.

(Production of SIH)

301.9 q of water and 150 g of toluene were fed to a 1-liter flask equipped with a stirrer, a cooling device and a thermometer, and the inside temperature of the flask was reduced to 5° C. A mixture of 21.7 g of trimethyl chlorosilane, 23.0 g of methyl dichlorosilane, 12.9 g of dimethyl dichlorosilane and 76.0 g of diphenyl dichlorosilane was fed to a dropping funnel and added dropwise to the flask over 2 hours under agitation. During this, cooling was continued to keep the inside temperature of the flask at 20° C. or lower. After the end of addition, stirring was continued for 4 hours to age the mixture at an inside temperature of 20° C., the reaction mixture was left, the separated hydrochloric acid water layer was removed, a 10% sodium carbonate aqueous solution was added, stirred for 5 minutes and left, and the separated water phase was removed. Thereafter, the resulting product was washed in ion exchange water 3 times to confirm that a toluene layer became neutral. This toluene solution was heated up to an inside temperature of 120° C. under reduced pressure to remove toluene and low-boiling matter, and insoluble matter was removed by filtration to obtain a silicone compound SIH. This silicone compound SIH had an Si—H group content of 0.21 mol/100 g, an aromatic group content of 49 wt % and an average polymerization degree of 8.0.

IRG: hindered phenol-based antioxidant (Irganox1076 of Ciba Specialty Chemicals Co., Ltd.)

G250: compound having an epoxy group (MARPROOF G-0250S of NOF Corporation)

SL: fatty acid ester comprising glycerin tristearate as the main component (SL-900 of Riken Vitamin Co Ltd.)

LD: bead-like crosslinked silicone (TSR9002 of Momentive Performance Materials Japan LLC)

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Component A | A-1 | 60 | | | | | | |
| | A-2 | 40 | 100 | 100 | 100 | 100 | 100 | 100 |
| | A-3 | | | | | | | |
| | A-4 | | | | | | | |
| | A-5 | | | | | | | |
| Component B | B-1 | 0.05 | 0.05 | 0.05 | 0.05 | 0.05 | | |
| | B-2 | | | | | | 0.005 | |
| | B-3 | | | | | | | 0.1 |
| Component C | C-1 | 0.005 | 0.02 | 0.02 | 0.02 | 0.02 | 0.02 | 0.02 |
| Component D | D-1 | 0.05 | 0.08 | | | | 0.08 | 0.08 |
| | D-2 | | | 0.08 | | | | |
| | D-3 | | | | 0.08 | | | |
| | D-4 | | | | | 0.08 | | |

TABLE 1-continued

|  |  |  |  |  |  |  |  |  |
|---|---|---|---|---|---|---|---|---|
| Others | SIH |  |  |  |  |  |  |  |
|  | IRG |  |  |  |  |  |  |  |
|  | G250 |  | 0.0075 | 0.0075 | 0.0075 | 0.0075 | 0.0075 | 0.0075 |
|  | SL |  |  |  |  |  |  |  |
| Brightness | cd/m² | 2,610 | 2,630 | 2,610 | 2,720 | 2,750 | 2,630 | 2,600 |
| Haze | Evaluation | ○ | ○ | ○ | ○ | ○ | ○ | ○ |
| Flame retardancy | 2.0 mm | V-0 | V-0 | V-0 | V-0 | V-0 | V-2 | V-2 |

|  |  | Ex. 8 | Ex. 9 | Ex. 10 | Ex. 11 | Ex. 12 | Ex. 13 | Ex. 14 |
|---|---|---|---|---|---|---|---|---|
| Component A | A-1 |  |  |  |  |  |  |  |
|  | A-2 |  |  |  | 100 | 100 | 100 | 100 |
|  | A-3 | 100 |  |  |  |  |  |  |
|  | A-4 |  | 100 |  |  |  |  |  |
|  | A-5 |  |  | 100 |  |  |  |  |
| Component B | B-1 | 0.05 | 0.05 | 0.05 | 0.05 | 0.05 | 0.05 | 0.05 |
|  | B-2 |  |  |  |  |  |  |  |
|  | B-3 |  |  |  |  |  |  |  |
| Component C | C-1 | 0.02 | 0.02 | 0.02 | 0.02 | 0.02 | 0.02 | 0.08 |
| Component D | D-1 | 0.08 | 0.08 | 0.08 | 0.08 | 0.08 | 0.08 | 0.08 |
|  | D-2 |  |  |  |  |  |  |  |
|  | D-3 |  |  |  |  |  |  |  |
|  | D-4 |  |  |  |  |  |  |  |
| Others | SIH |  |  |  |  |  | 0.5 |  |
|  | IRG |  |  |  | 0.05 |  |  |  |
|  | G250 | 0.0075 | 0.0075 | 0.0075 | 0.0075 | 0.0075 | 0.0075 | 0.0075 |
|  | SL |  |  |  |  |  | 0.2 | 0.2 |
| Brightness | cd/m² | 2,650 | 2,550 | 2,570 | 2,610 | 2,600 | 2,610 | 2,700 |
| Haze | Evaluation | ○ | ○ | ○ | ○ | ○ | ○ | ○ |
| Flame retardancy | 2.0 mm | V-1 | V-2 | V-2 | V-0 | V-0 | V-0 | V-0 |

|  |  | Ex. 15 | Ex. 16 | Ex. 17 | Ex. 18 | Ex. 19 | Ex. 20 |
|---|---|---|---|---|---|---|---|
| Component A | A-1 |  | 100 |  |  | 100 | 100 |
|  | A-2 | 100 |  | 100 | 100 |  |  |
|  | A-3 |  |  |  |  |  |  |
|  | A-4 |  |  |  |  |  |  |
|  | A-5 |  |  |  |  |  |  |
| Component B | B-1 | 0.05 | 0.02 | 0.05 | 0.05 | 0.005 | 0.09 |
|  | B-2 |  |  |  |  |  |  |
|  | B-3 |  |  |  |  |  |  |
| Component C | C-1 |  | 0.005 |  |  | 0.02 |  |
| Component D | D-1 | 0.8 |  | 0.08 |  |  |  |
|  | D-2 |  |  |  |  |  |  |
|  | D-3 |  |  |  |  |  |  |
|  | D-4 |  |  |  |  |  |  |
| Others | SIH |  |  |  |  |  |  |
|  | IRG |  |  |  |  |  |  |
|  | G250 |  | 0.0075 |  | 0.0075 | 0.0075 |  |
|  | SL | 0.2 |  |  |  |  |  |
| Brightness | cd/m² | 2,690 | 2,490 | 2,470 | 2,490 | 2,470 | 2,450 |
| Haze | Evaluation | ○ | ○ | ○ | ○ | ○ | ○ |
| Flame retardancy | 2.0 mm | V-0 | V-0 | V-0 | V-0 | V-0 | V-0 |

Ex.: Example

TABLE 2

|  |  | Comparative Example 1 | Comparative Example 2 | Comparative Example 3 |
|---|---|---|---|---|
| Component A | A-1 | 100 | 100 | 100 |
|  | A-2 |  |  |  |
|  | A-3 |  |  |  |
|  | A-4 |  |  |  |
|  | A-5 |  |  |  |
| Component B | B-1 |  | 0.2 | 0.02 |
|  | B-2 |  |  |  |
|  | B-3 |  |  |  |
| Component C | C-1 |  |  |  |
| Component D | D-1 |  |  |  |
|  | D-2 |  |  |  |
|  | D-3 |  |  |  |
|  | D-4 |  |  |  |
| Others | SIH |  |  |  |
|  | IRG |  |  |  |
|  | G250 |  |  |  |
|  | SL |  |  |  |
|  | LD |  |  | 0.2 |
| Brightness | cd/m² | 2,390 | 0 | 1250 |
| Haze | Evaluation | ○ | X | X |
| Flame retardancy | 2.0 mm | not V | V-0 | V-0 |

Example 21

The resin composition of Example 1 was dried at 120° C. for 6 hours with a hot air drier and molded at a cylinder temperature of 320° C. and a mold temperature of 80° C. by means of an injection molding machine [SG150U•S-M IV of Sumitomo Heavy Industries, Ltd.] to obtain a plate having a length of 150 mm, a width of 150 mm and a thickness of 2.0 mm (an uneven pattern was printed on one side) as a light guide plate.

This light guide plate, a white reflective plate made of a resin composition comprising 100 parts by weight of an aromatic polycarbonate resin and 10 parts by weight of titanium oxide (thickness of 1.0 mm) and a light source which was a cold-cathode tube (brightness of 3,300 cd/m$^2$) were used to manufacture a surface light source body shown in FIG. 1. The surface light source body had a ratio (L2/L1) of brightness at a position 20 mm away from the light source (L1) to brightness at a position 130 mm away from the light source (L2) of 0.93 and exhibited uniform surface luminescence without reducing the brightness.

Example 22

The resin composition of Example 1 was dried at 120° C. for 6 hours with a hot air drier and molded at a cylinder temperature of 320° C. and a mold temperature of 80° C. by means of an injection molding machine [SG150U•S-M IV of Sumitomo Heavy Industries, Ltd.] to obtain a cylindrical molded product having a diameter of 10 mm and a length of 200 mm as a light guide.

Figure 2:
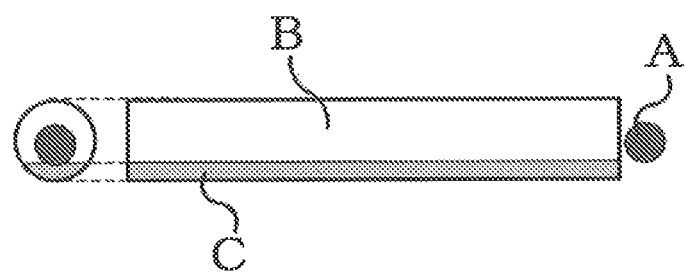
FIG. 2 is a schematic diagram of a surface light source body produced in Example 22.

This light guide, a white reflective plate made of a resin composition comprising 100 parts by weight of an aromatic polycarbonate resin and 10 parts by weight of titanium oxide (maximum thickness of 1.5 mm) and an LED light source (brightness of 4,850 cd/m$^2$) were used to manufacture a surface light source body shown in FIG. 2. The surface light source body had a ratio (L2/L1) of brightness at a position 20 mm away from the light source (L1) to brightness at a position 180 mm away from the light source (L2) of 0.9 and exhibited uniform surface luminescence without reducing the brightness.

EFFECT OF THE INVENTION

The light guide of the present invention exhibits excellent light guiding properties and flame retardancy though it does not comprise a light diffusing agent. The light guide of the present invention rarely deteriorates in brightness even at a position away from a light source, which is an effect not obtained by a light guide which contains a light diffusing agent.

The resin composition for light guides of the present invention exhibits excellent light guiding properties and flame retardancy though it does not comprise a light diffusing agent.

INDUSTRIAL APPLICABILITY

Since the resin composition for light guides of the present invention has high light guiding properties and can provide flame retardancy, it is extremely useful for various industrial fields such as lighting equipment including LED lamps, OA equipment and electric and electronic equipment.

The invention claimed is:

1. A light guide formed from a resin composition which consists of:
   (i) 100 parts by weight of a polycarbonate resin (component A) obtained by reacting a raw material consisting of a dihydroxy compound and a carbonate precursor,
   (ii) 0.01 to 0.05 parts by weight of a flame retardant (component B), wherein the flame retardant (component B) is at least one selected from the group consisting of alkali metal salt of a perfluoroalkylsulfonic acid and alkali earth metal salt of a perfluoroalkylsulfonic acid, and
   (iii) no light diffusing agent, which is particles having a refractive index difference from that of the polycarbonate resin (component A) of 0.001 or more,
   (iv) 0.001 to 0.1 part by weight of a trialkyl phosphate (component C),
   (v) 0.001 to 1.0 part by weight of a heat stabilizer except for the trialkyl phosphate (component D),
   (vi) 0 to 0.2 part by weight of an epoxy compound, and
   (vii) 0 to 0.3 part by weight of a release agent,
   wherein the resin composition shows flame retardancy of V-0 or V-1 under UL94 vertical burn test made on the specimen having a thickness of 2.0 mm.

2. The light guide according to claim 1, wherein the component D is at least one compound selected from the group consisting of a compound represented by the following formula (1), a compound represented by the following formula (2), and a compound represented by the following formula (3):

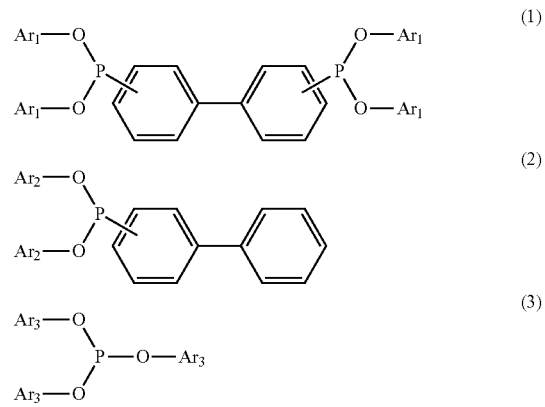

wherein, in the above formulas, $Ar_1$s and $Ar_2$s are aromatic groups which may have an alkyl substituent having 6 to 20 carbon atoms and may be the same or different, and $Ar_3$s are dialkyl-substituted aromatic groups having 8 to 20 carbon atoms and may be the same or different.

3. The light guide according to claim 1, wherein the component D is a compound represented by the following formula (4):

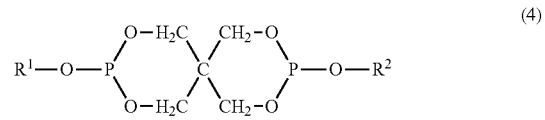

wherein, in the above formula, $R^1$ and $R^2$ are each a hydrogen atom, alkyl group, cycloalkyl group, alkyl-substituted cycloalkyl group, aryl group, alkyl-substituted aryl group or aryl-substituted aryl group and may be the same or different.

4. The light guide according to claim 1, wherein the component D is a compound represented by the following formula (5):

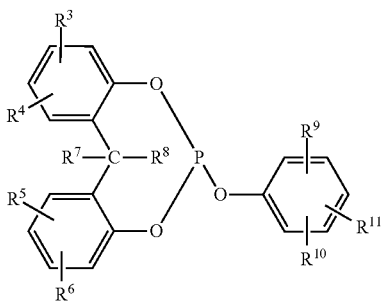

(5)

wherein, in the above formula, $R^3$, $R^4$, $R^5$, $R^6$, $R^9$, $R^{10}$ and $R^{11}$ are each independently a hydrogen atom, alkyl group having 1 to 12 carbon atoms, cycloalkyl group, aryl group or aralkyl group, $R^7$ is a hydrogen atom or alkyl group having 1 to 4 carbon atoms, and $R^8$ is a hydrogen atom or methyl group.

5. The light guide according to claim 1, wherein the component A is a polycarbonate resin having a structural viscosity index (N) of 1.5 to 2.5.

6. A surface light source body comprising the light guide of claim 1, a reflective plate and a light source.

7. A resin composition for light guides which consists of:
(i) 100 parts by weight of a polycarbonate resin (component A) obtained by reacting a raw material consisting of a dihydroxy compound and a carbonate precursor,
(ii) 0.01 to 0.05 parts by weight of a flame retardant (component B), wherein the flame retardant (component B) is at least one selected from the group consisting of alkali metal salt of a perfluoroalkylsulfonic acid and alkali earth metal salt of a perfluoroalkylsulfonic acid, and
(iii) no light diffusing agent, which is particles having a refractive index difference from that of the polycarbonate resin (component A) of 0.001 or more,
(iv) 0.001 to 0.1 part by weight of a trialkyl phosphate (component C),
(v) 0.001 to 1.0 part by weight of a heat stabilizer except for the trialkyl phosphate (component D),
(vi) 0 to 0.2 part by weight of an epoxy compound, and
(vii) 0 to 0.3 part by weight of a release agent,
wherein the resin composition shows flame retardancy of V-0 or V-1 under UL94 vertical burn test made on the specimen having a thickness of 2.0 mm.

8. The resin composition for light guides according to claim 7, wherein the component D is at least one compound selected from the group consisting of a compound represented by the following formula (1), a compound represented by the following formula (2), and a compound represented by the following formula (3):

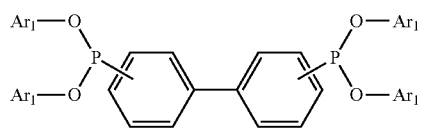

(1)

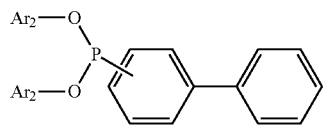

(2)

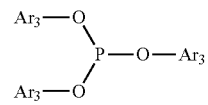

(3)

wherein, in the above formulas, $Ar_1s$ and $Ar_2s$ are aromatic groups which may have an alkyl substituent having 6 to 20 carbon atoms and may be the same or different, and $Ar_3s$ are dialkyl-substituted aromatic groups having 8 to 20 carbon atoms and may be the same or different.

9. The resin composition for light guides according to claim 7, wherein the component D is a compound represented by the following formula (4):

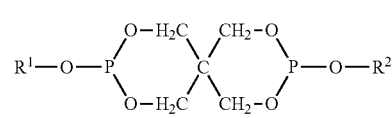

(4)

wherein, in the above formula, $R^1$ and $R^2$ are each a hydrogen atom, alkyl group, cycloalkyl group, alkyl-substituted cycloalkyl group, aryl group, alkyl-substituted aryl group or aryl-substituted aryl group and may be the same or different.

10. The resin composition for light guides according to claim 7, wherein the component D is a compound represented by the following formula (5):

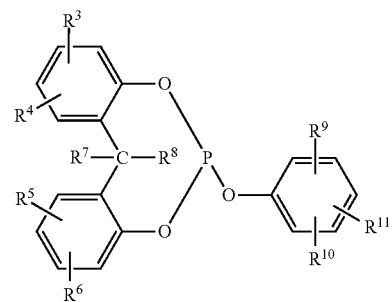

(5)

wherein, in the above formula, $R^3$, $R^4$, $R^5$, $R^6$, $R^9$, $R^{10}$ and $R^{11}$ are each independently a hydrogen atom, alkyl group having 1 to 12 carbon atoms, cycloalkyl group, aryl group or aralkyl group, $R^7$ is a hydrogen atom or alkyl group having 1 to 4 carbon atoms, and $R^8$ is a hydrogen atom or methyl group.

11. The resin composition for light guides according to claim 7, wherein the component A is a polycarbonate resin having a structural viscosity index (N) of 1.5 to 2.5.

12. A method for improving the light guiding properties of a molded product formed from a resin composition without using a light diffusing agent, comprising
preparing resin composition which consists of:
(i) 100 parts by weight of a polycarbonate resin (component A) obtained by reacting a raw material consisting of a dihydroxy compound and a carbonate precursor,
(ii) 0.01 to 0.05 parts by weight of a flame retardant (component B), wherein the flame retardant (component B) is at least one selected from the group consisting of alkali metal salt of a perfluoroalkylsulfonic acid and alkali earth metal salt of a perfluoroalkylsulfonic acid, and
(iii) no light diffusing agent, which is particles having a refractive index difference from that of the polycarbonate resin (component A) of 0.001 or more,
(iv) 0.001 to 0.1 part by weight of a trialkyl phosphate (component C),
(v) 0.001 to 1.0 part by weight of a heat stabilizer except for the trialkyl phosphate (component D),
(vi) 0 to 0.2 part by weight of an epoxy compound, and
(vii) 0 to 0.3 part by weight of a release agent,
wherein the resin composition shows flame retardancy of V-0 or V-1 under UL94 vertical burn test made on the specimen having a thickness of 2.0 mm, and
molding the resin composition to obtain a molded product.

* * * * *